US012465540B2

(12) United States Patent
Rosenstein et al.

(10) Patent No.: US 12,465,540 B2
(45) Date of Patent: Nov. 11, 2025

(54) UNICOMPARTMENTAL KNEE POSITIONER

(71) Applicant: Innovative Medical Products, Inc., Plainville, CT (US)

(72) Inventors: Alexander Rosenstein, Laguna Niguel, CA (US); Scott Albino, Southington, CT (US)

(73) Assignee: Innovative Medical Products, Inc., Plainville, CT (US)

( * ) Notice: Subject to any disclaimer, the term of this patent is extended or adjusted under 35 U.S.C. 154(b) by 59 days.

(21) Appl. No.: 18/614,667

(22) Filed: Mar. 23, 2024

(65) Prior Publication Data

US 2025/0295541 A1 Sep. 25, 2025

(51) Int. Cl.
*A61G 13/12* (2006.01)

(52) U.S. Cl.
CPC ....... *A61G 13/1245* (2013.01); *A61G 13/129* (2013.01); *A61G 13/1295* (2013.01)

(58) Field of Classification Search
CPC .............. A61G 13/1245; A61G 13/129; A61G 13/1295
See application file for complete search history.

(56) References Cited

U.S. PATENT DOCUMENTS

| | | | | |
|---|---|---|---|---|
| 4,373,709 | A * | 2/1983 | Whitt | A61G 13/12 5/624 |
| 6,012,456 | A * | 1/2000 | Schuerch | A61G 13/12 5/624 |
| 2012/0318278 | A1* | 12/2012 | Aboujaoude | A61G 13/1245 128/845 |
| 2017/0312158 | A1* | 11/2017 | Blackwell | A61G 7/1096 |

* cited by examiner

*Primary Examiner* — Jonathan Liu
(74) *Attorney, Agent, or Firm* — Wasserbauer Law, LLC; Damian G. Wasserbauer, Esq.; Nicholas E. Blanton, Esq.

(57) ABSTRACT

This invention relates to a patient positioner and, more specifically, to an articulated armature configured to position a leg and knee at a precise angle, as needed in unicompartmental knee arthroplasty surgery. The positioner is adapted to connect to either side rail of a support table, without changing orientation, via drop pins disposed in a socket clamp. The socket clamp may couple to a ball coupled to a first arm and elbow joint, which in turn may couple to a second arm and wrist joint, which in turn may couple to a pad assembly adapted to hold the patient's thigh, thereby positioning the lower leg to dangle over the side or end of an operating table. The positioner is adapted for ease of disassembly, sterilization, and reassembly. The invention may be exchanged for a total knee replacement positioner without moving the patient or breaking the sterile field.

2 Claims, 22 Drawing Sheets

UNICOMPARTMENTAL KNEE POSITIONER

TECHNICAL FIELD

The present invention relates to a patient positioner and, more specifically, to an articulated armature configured to position, hold, and maintain a leg and the knee at a precise angle and position, as needed in unicompartmental knee arthroplasty surgery.

BACKGROUND

Unicompartmental knee arthroplasty, or "UKA" surgery, is a surgical procedure used to relieve arthritis in the knee by replacing a portion of the knee. For the appropriate candidate, UKA surgery represents an attractive option particularly because a UKA surgery may reduce post-operative pain and may result in a shorter recovery period, as compared to a total knee replacement, for example. Furthermore, UKA surgery may require a smaller incision, which leaves less scarring, and typically removes less tissue, thereby leaving healthy, or otherwise functionable tissue intact. UKA surgery differs from full knee replacement surgery with regard to the way the leg and knee are held during surgery. In full knee replacement surgery, the foot is placed in a boot positioned over or in line with the operating room (OR) table and slides linearly along a rail allowing the knee to be oriented at the proper angle. For UKA surgery, it is desirable for the foot to dangle off the end or side of the OR table such that it produces a precise, angle of knee flexion. This angle is generally described as a 110-degree angle as defined by the obtuse angle formed between the thigh and the horizontal plane. This angle provides release and/or otherwise relaxes certain knee ligaments and musculature, which then provides the proper opening of the knee for access to its inner structures and/or compartments. Thus, there is a long-felt need in the surgical industry for a UKA knee positioner and complete system solution for partial knee surgeries.

Occasionally, when performing a UKA procedure, the surgeon will determine that UKA will not suffice for the given state of a patient's knee and that a full knee replacement will be necessary. In this case, using a conventional knee positioner it may be necessary to break down the sterile field, remove the patient from the OR, reconfigure the OR table with a conventional boot-enabled positioner, re-introduce the patient, and re-establish the sterile field, all of which adds time and cost to the procedure. Thus, there is a long felt need for a UKA knee positioner wherein a transition to a full knee replacement configuration does not involve removal of the patient and/or disruption of the sterile field.

Other problems exist with conventional positioner systems due to numerous factors such as the hardware and associated components are not structurally rigid, are not easily sterilizable, and/or are not capable of providing the positioning angles desired for the operation. Also, conventional knee positioners may require moving the patient in order to adjust the leg and knee position. Furthermore, conventional knee positioners may require pre-configuration for one side of the support table, i.e., the left or right, prior to the sterilization process, thereby requiring that both types be stored and doubling the number of positioners needed. Consequently, there is a long-felt need to overcome the disadvantages of conventional positioner systems.

SUMMARY

The present invention discloses a functionally and economically advantageous knee positioner that is structurally rigid, easily sterilizable, and provides the desired positioning angles for a UKA surgical operation on a support table or operating room (OR) table.

It is an object of the present invention to allow positioner setup on either the left or right side of an operating table from a single, pre-configured, sterilized state.

It is an object of the present invention to allow multiple adjustments, including setting the position of the leg pad anywhere in a hemisphere, without moving the patient on the OR table.

It is an object of the present invention to provide, in a preferred embodiment, about a 110-degree knee angle for a leg dangling off the side or end of an OR table for unicompartmental knee replacement. In another embodiment, the knee positioner according to the present invention is configured to provide a stable knee angle ranging between about 108 degrees and about 112 degrees. In yet another embodiment, the knee positioner according to the present invention is configured to provide a stable knee angle ranging between 105 degrees and about 115 degrees.

It is an object of the present invention to provide a surgical knee positioner with components which can operatively connect for use during surgery, and which can decouple to facilitate sterilization.

It is an object of the present invention to provide for changing of the knee positioner to one appropriate for full knee replacement without moving the patient or disrupting the sterile field.

Other desirable features and characteristics will become apparent from the subsequent detailed description, the drawings, and the appended claims, when considered in view of this summary.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, which are incorporated in and constitute a part of this specification, show certain aspects of the subject matter disclosed herein and, together with the description, help explain some of the principles associated with the disclosed implementations, wherein.

DETAILED DESCRIPTION

Figure 1:
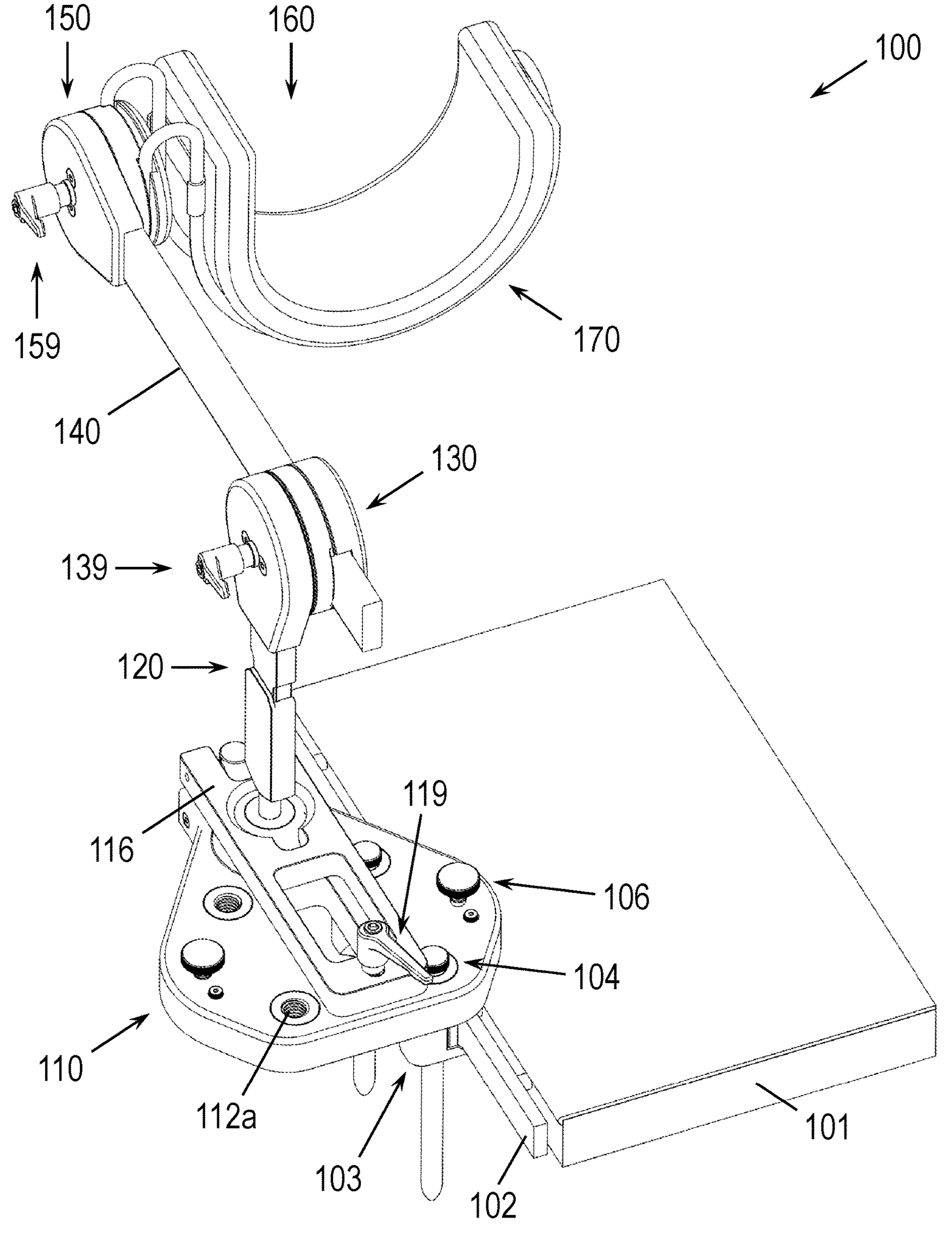
FIG. 1 illustrates a front, top, right side perspective view of a unicompartmental knee positioner, in accordance with an embodiment of the present invention.
Figure 2A:
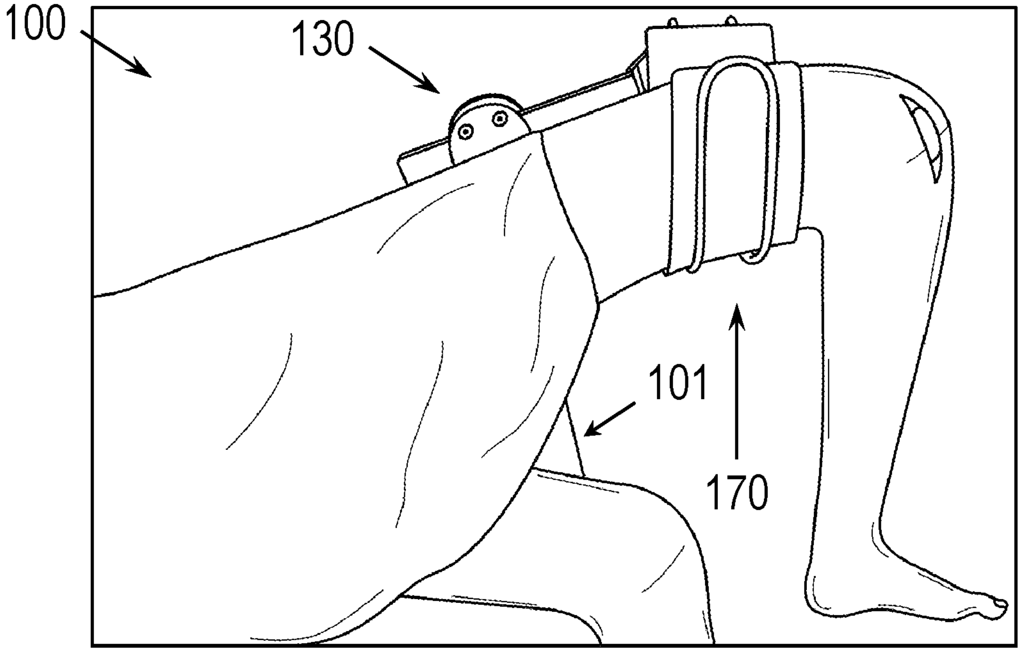
FIG. 2A illustrates a rear environmental view of a unicompartmental knee positioner, in accordance with an embodiment of the present invention.
Figure 2B:
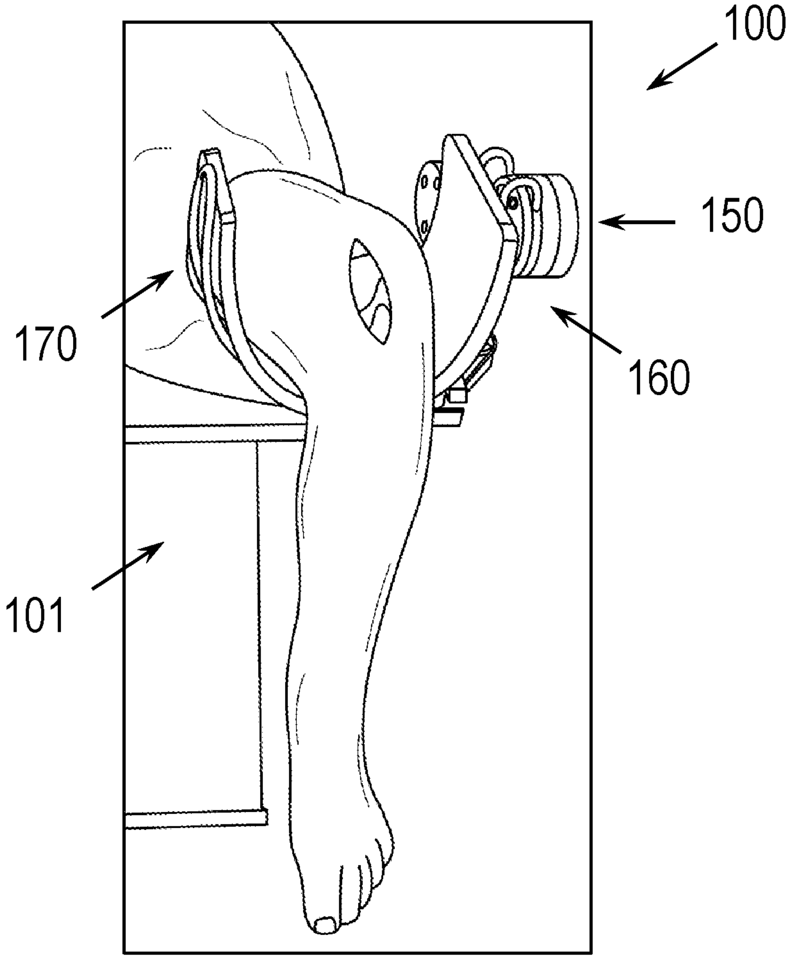
FIG. 2B illustrates a left-side environmental view of a unicompartmental knee positioner, in accordance with an embodiment of the present invention.
Figure 2C:
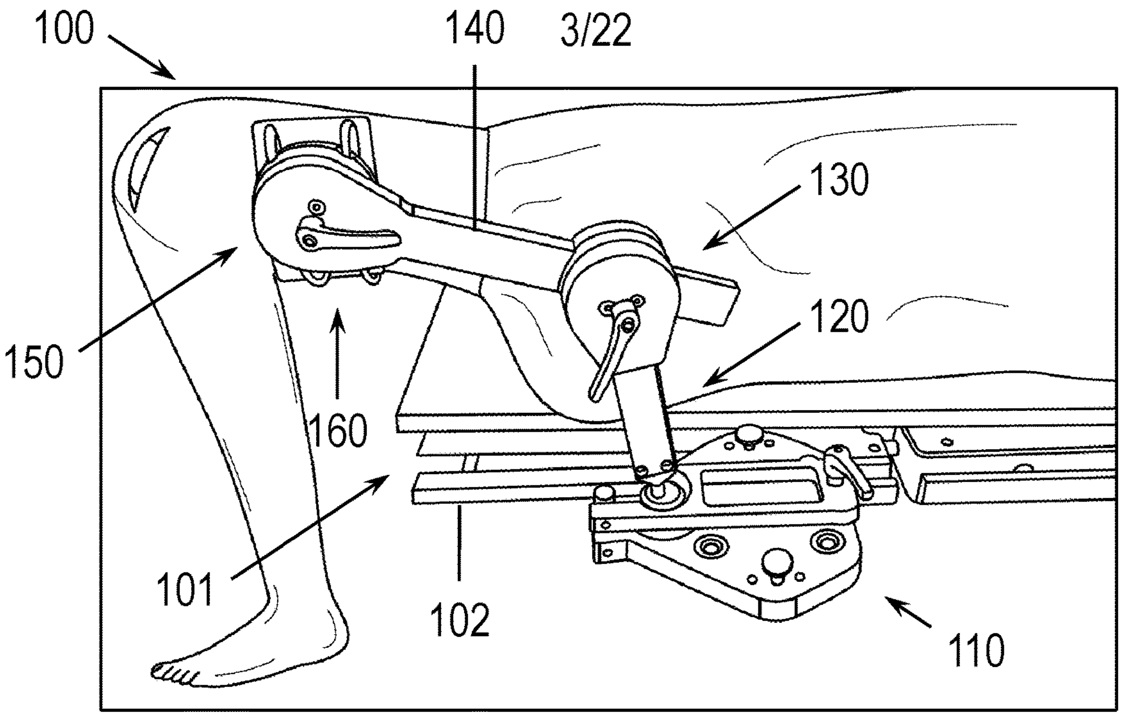
FIG. 2C illustrates a right-side environmental view of a unicompartmental knee positioner, in accordance with an embodiment of the present invention.
Figure 2D:
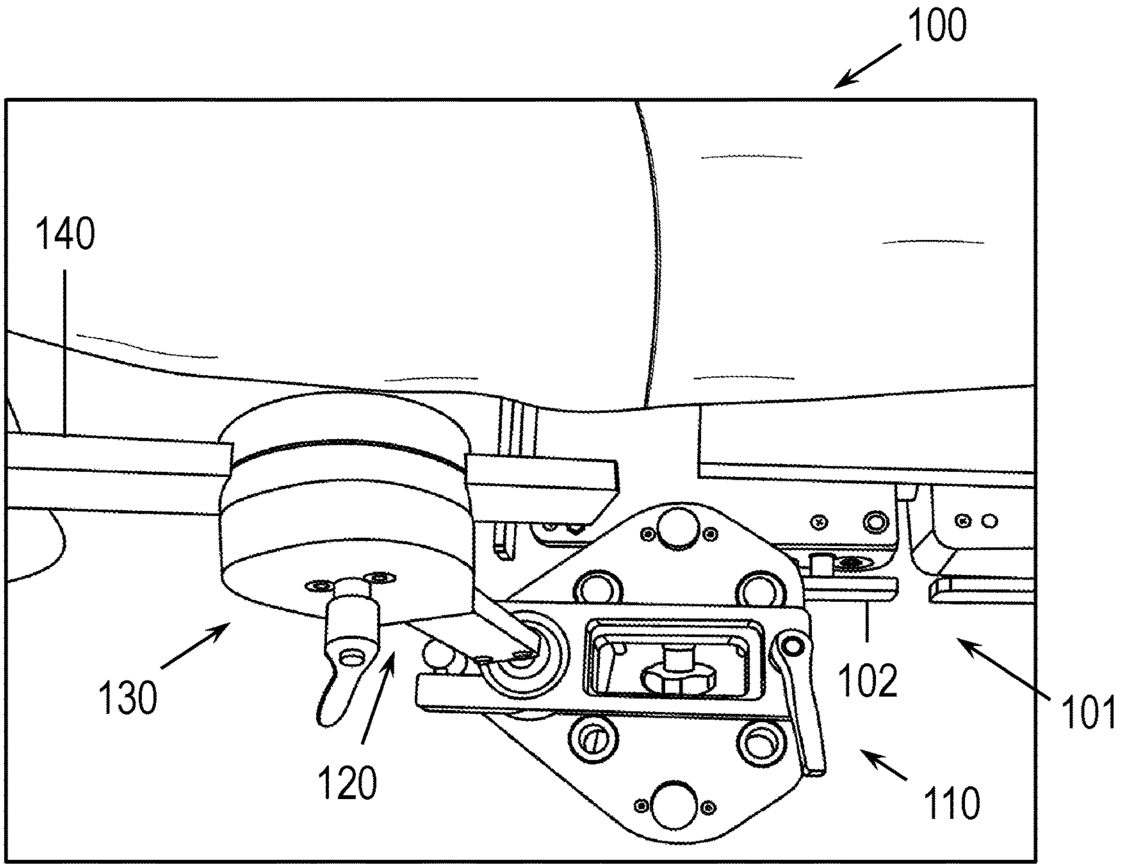
FIG. 2D illustrates a top-down environmental view of a unicompartmental knee positioner, in accordance with an embodiment of the present invention.

Non-limiting embodiments of the present invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention. For a better understanding of the present invention, reference will be made to the following Detailed Description, which is to be read in association with the accompanying drawings, which are incorporated in and constitute a part of this specification, show certain aspects of the subject matter disclosed herein and, together with the description, help explain some of the principles associated with the disclosed implementations.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As is illustrated in FIGS. 1-20 a unicompartmental knee positioner apparatus, system, and method is generally shown as element 100, in accordance with an embodiment of the present invention. Referring to FIG. 1, the knee positioner 100 is shown in a fully assembled configuration, and may comprise a socket clamp assembly 110, first arm 120 and elbow joint 130 assemblies, and second arm 140 and wrist joint 150 assemblies coupled to leg holder 160 and leg pad 170 assemblies. The positioner 100 may be secured to the side rail 102 of an operating table 101 (partially shown) using a clamp assembly 103, which works in conjunction with one or more drop pin assemblies, shown generally as 104. The clamp assembly 103 may be operably connected to the OR table 101 at side rail 102 by an equalizer clamp (as shown in FIG. 1), by a spring-loaded lever clamp (not shown), or by another suitable clamp adapted with a pin locking mechanism. The knee positioner 100 may be configured to receive the leg of a patient and hold the patient's thigh by coupling the same to the leg pad assembly 170, thereby facilitating operations such as unicompartmental knee arthroplasty, or "UKA surgery," to relieve arthritis in the knee by replacing a portion of the same.

Figure 3:
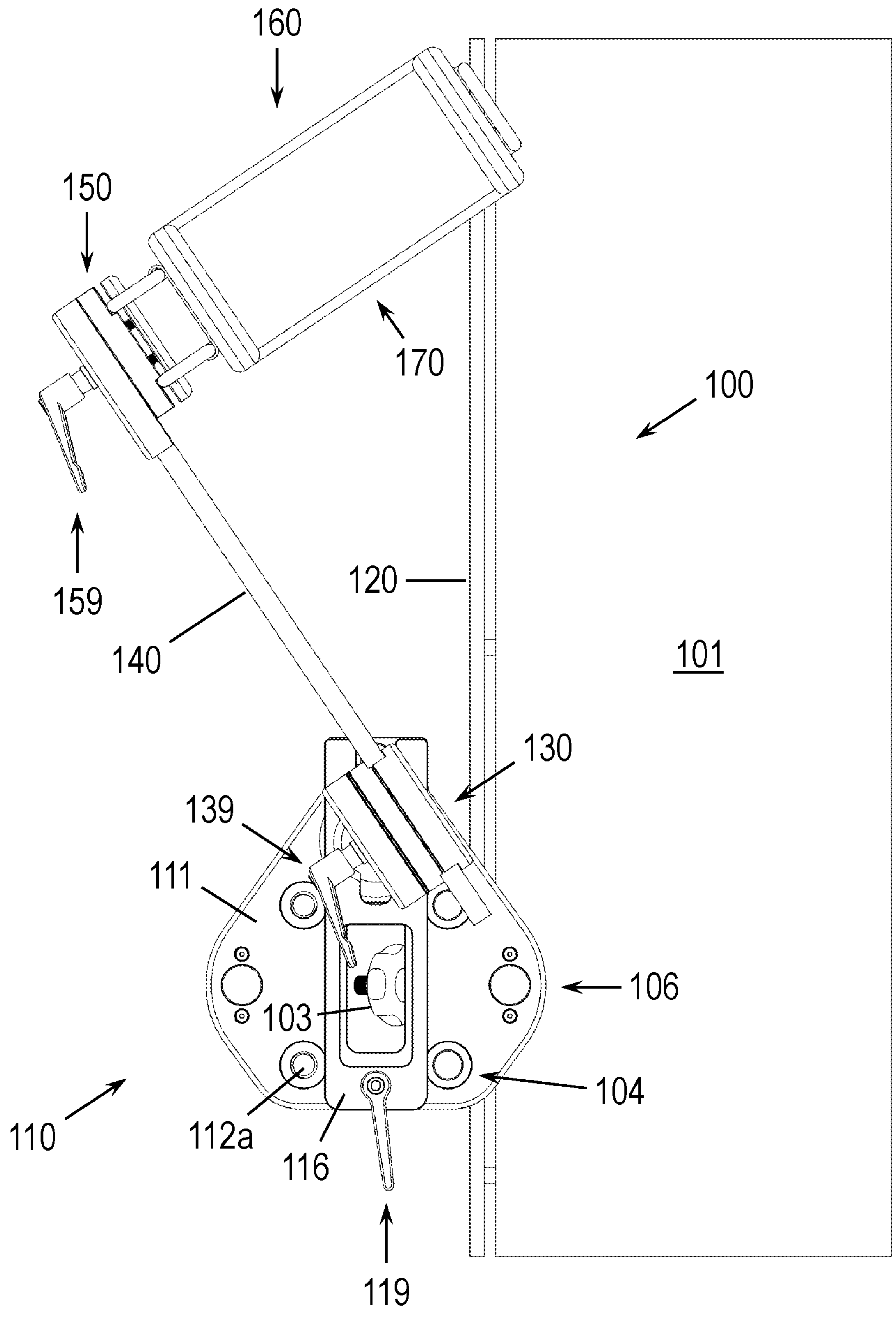
FIG. 3 illustrates a top view of a socket clamp assembly for a unicompartmental knee positioner configured to dangle the knee and lower leg off the side of the OR table, in accordance with an embodiment of the present invention.

FIGS. 2A through 2D illustrate the general use arrangement of the knee positioner 100. The leg pad assembly 160 holds the thigh above the OR table 101 with the knee extending beyond allowing the calf and foot to dangle at a 110° angle. The knee positioner may be configured to dangle the foot off of the end of the OR table or, more preferably, off the side of the OR table. The latter position allows the non-surgery leg to be fully supported by a full-length OR table while isolating the surgery knee and providing unencumbered access for the surgeon. FIG. 3 illustrates the knee positioner 100 configured to angle the knee, calf and foot off the side of the OR table. In this case the upper arm 140 is rotated away from the OR table by an angle of about 30 to 40°.

Referring to FIGS. 4 through 8, the socket clamp assembly 110 may comprise a lower base 111 disposed adjacent to an upper base 116. The lower base 111 may comprise a plurality of openings including threaded 112 and unthreaded 113 types adapted for various purposes. A first threaded opening 112*b* may receive the threaded portion 119*b* of the handle assembly 119 as it is inserted into the lower base 111. A plurality of second threaded openings 112*a* may be disposed on both sides of the lower base 111 and adapted to receive drop pin assemblies 104. One or more unthreaded through 113*a* and/or a blind 113*b* openings may be included to lightweight the lower base 111. A ball socket may be formed in the lower base 111 by a socket insert 114 in the form of a ring with a bowl or otherwise chamfered surface 114*a* configured to receive a ball, and with an opening 114*b* disposed in the lower base 111 to provide clearance for the ball. An unthreaded through opening 115*a* may be adapted to receive the post 115*b* of the hinge assembly 115. A hinge post bolt opening 115*c* may be adapted to receive a hinge post bolt 115*d* which may be used to secure the hinge post 115*b* to the lower base 111.

Figure 7:
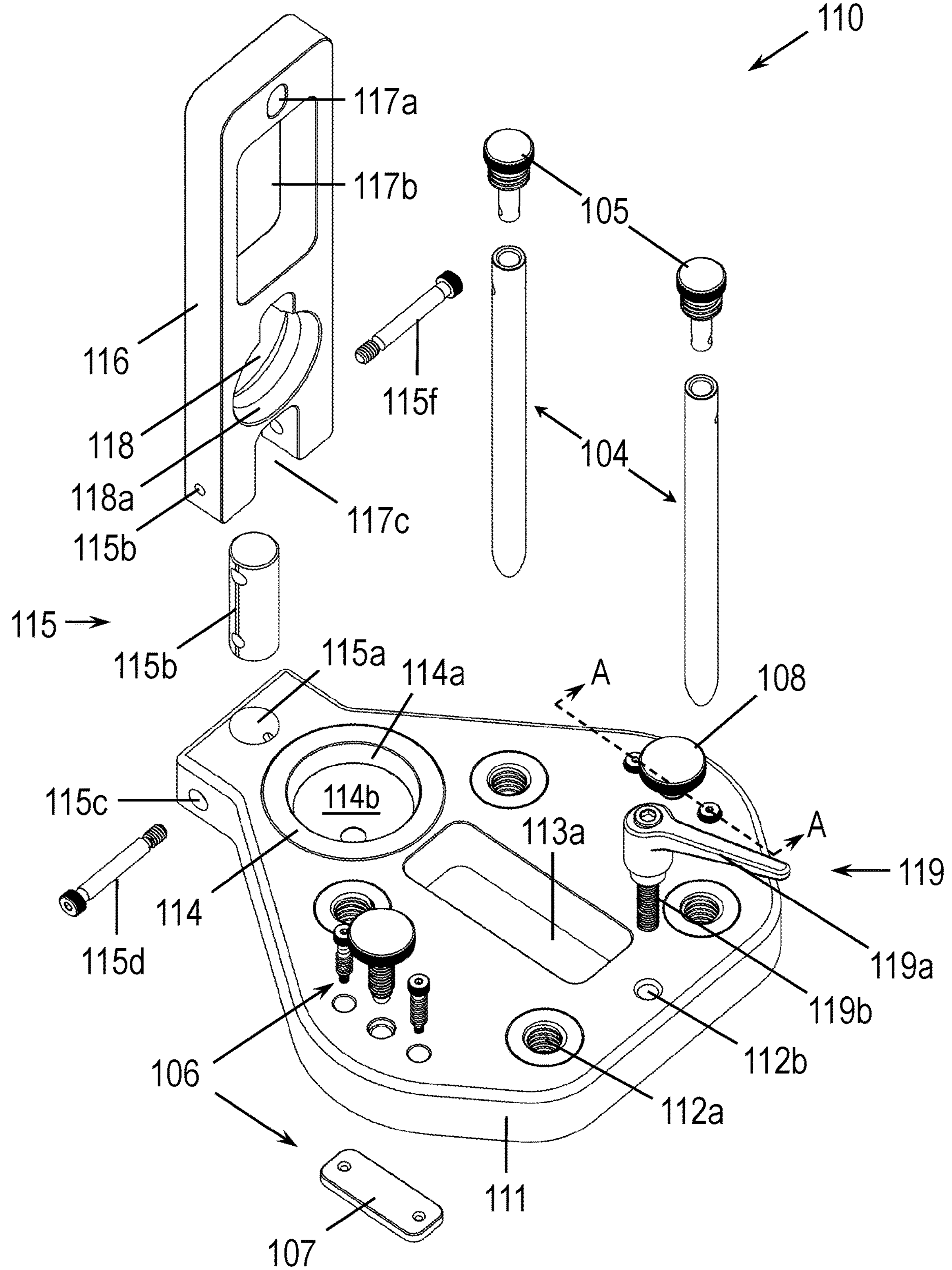
FIG. 7 illustrates a front, top, right side exploded view of a socket clamp assembly for a unicompartmental knee positioner, in accordance with an embodiment of the present invention.

The socket clamp assembly 110 may be configured to receive one or more drop pin assemblies 104, wherein each pin 104 may have a threaded portion 105 (as shown in FIG. 7) and wherein one or more drop pins 104 may be received by the lower base 111 having one or more openings 112*a* to allow the drop pins 104 to pass therethrough. Upon rotation of the drop pin assembly 104, the threaded portion 105 may engage the lower base 111 so that the drop pin assembly 104 remains fixedly coupled to the socket clamp assembly 110. The socket clamp assembly 110 further comprises a stabilizer pad sub-assembly 106. Advantageously, both the drop pin openings 112*a*-112*d* and stabilizer pad sub-assemblies are disposed on both sides of the lower base 111. This allows the socket clamp assembly 110 to be positioned in a cranial or caudal orientation regardless of to which side of the OR table it is attached. Consequently, dedicated left and right configurations are not required to be maintained throughout the sterilization and storage of the positioner 100. Furthermore, the socket clamp assembly 110 may be configured to couple various assemblies to the support table-such as surgical procedures other than UKA-which generally relate to patient positioners, of which, the knee positioner 100 is one example.

Figure 4:
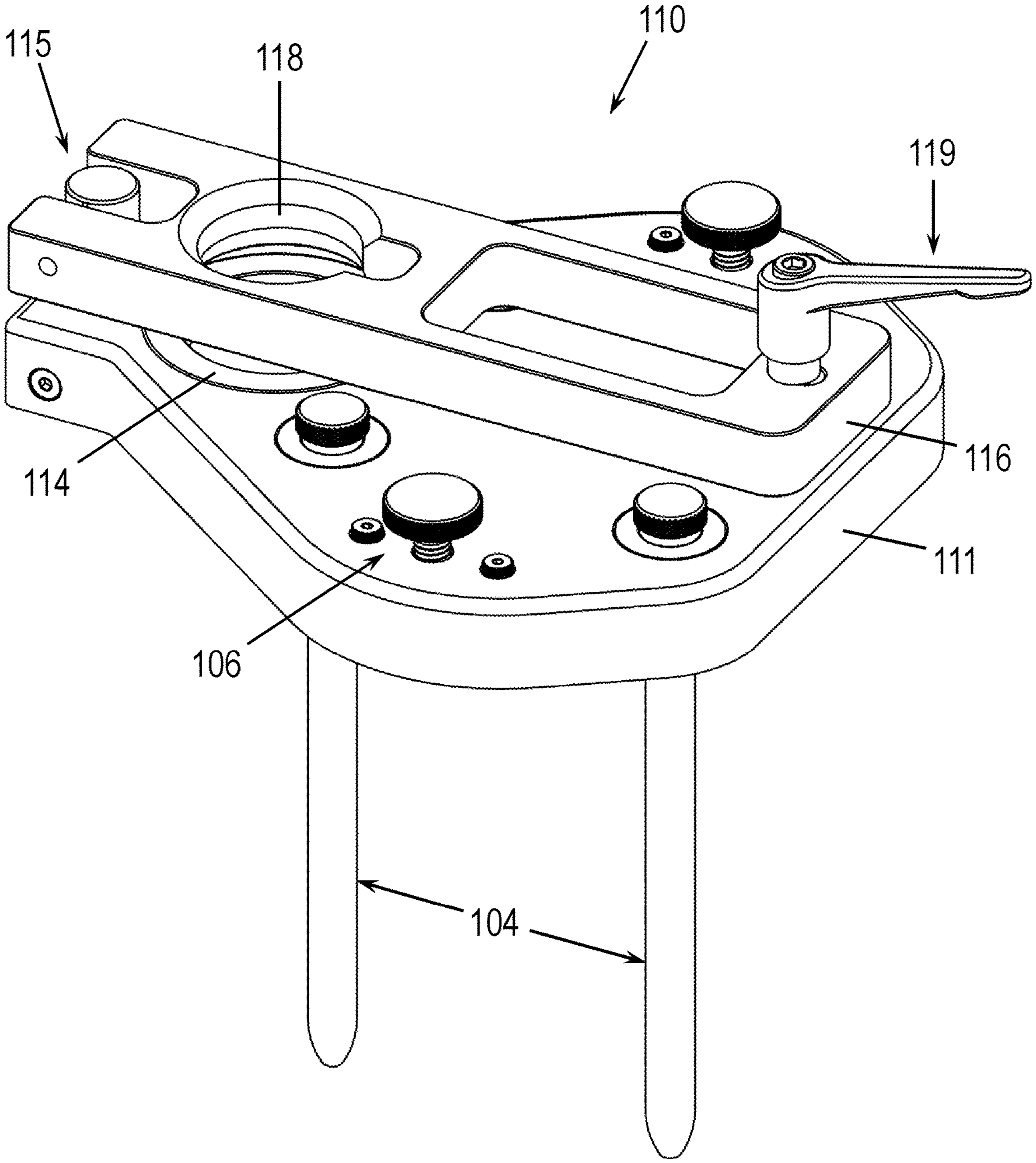
FIG. 4 illustrates a front, top, right side perspective view of a socket clamp assembly for a unicompartmental knee positioner, in accordance with an embodiment of the present invention.
Figure 5:
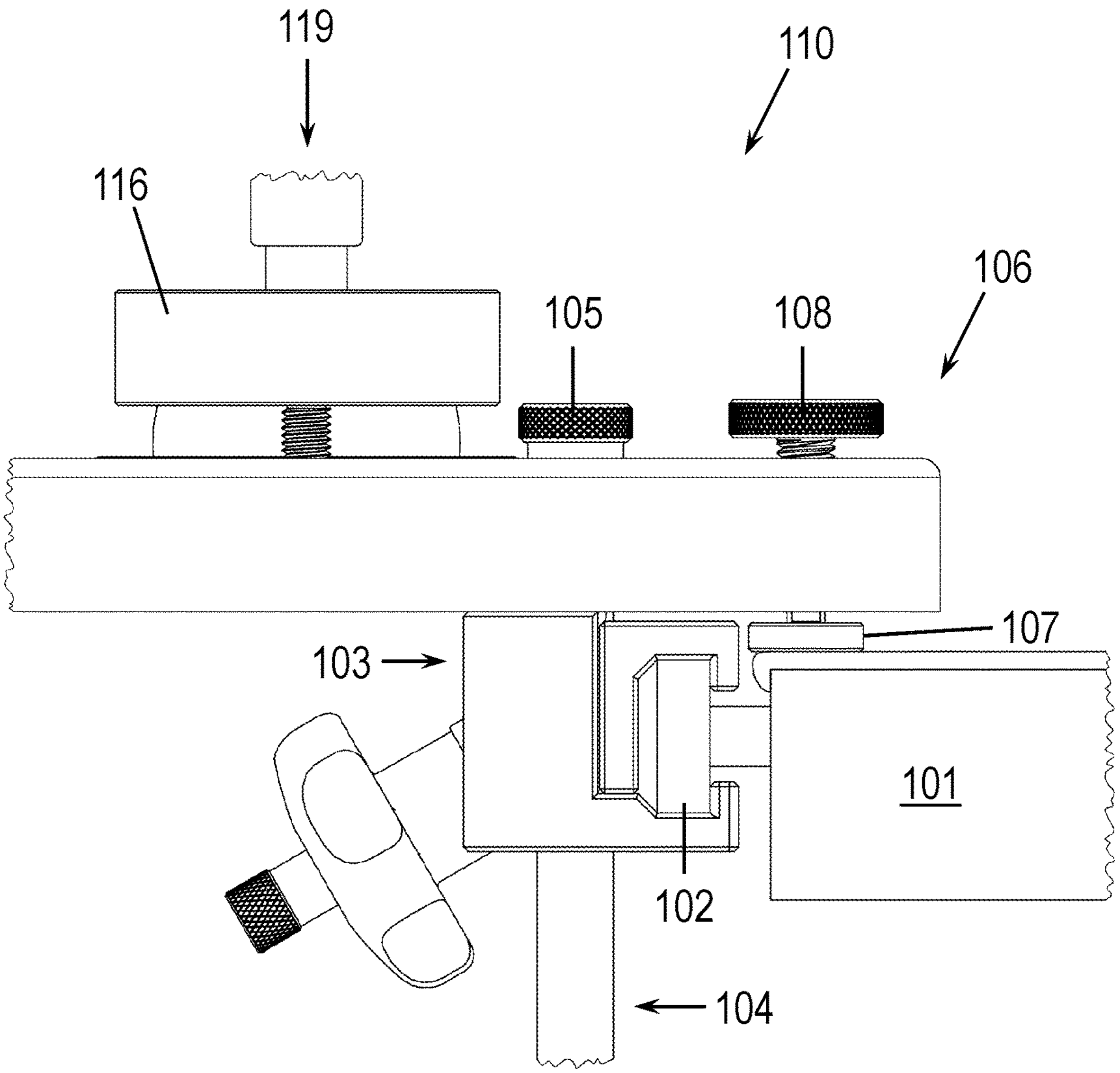
FIG. 5 illustrates a right-side detail view of a socket clamp assembly with a stabilizer pad extended to the surface of an OR table, in accordance with an embodiment of the present invention.
Figure 6:
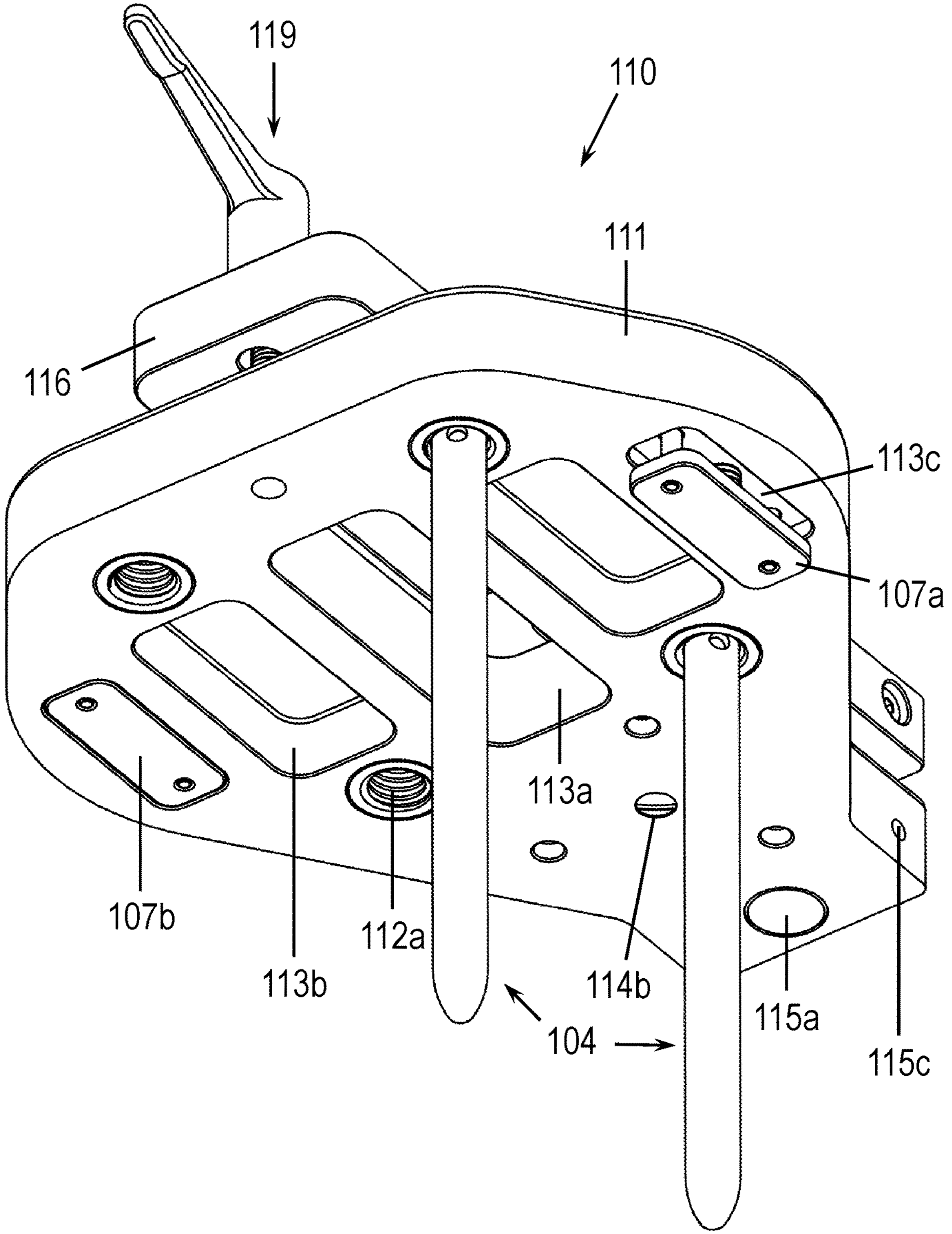
FIG. 6 illustrates a bottom, back, right side, perspective view of a socket clamp assembly for a unicompartmental knee positioner, in accordance with an embodiment of the present invention.
Figure 8A:
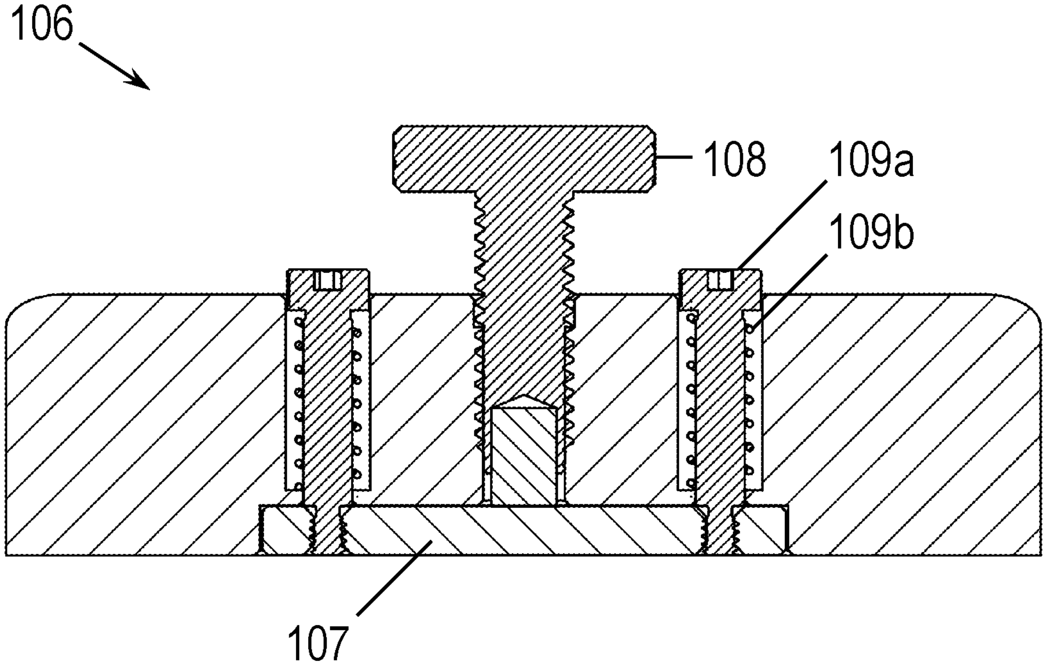
FIG. 8A illustrates a section view taken along section A-A of FIG. 7 of a stabilizer pad assembly with a stabilizer pad retracted, in accordance with an embodiment of the present invention.
Figure 8B:
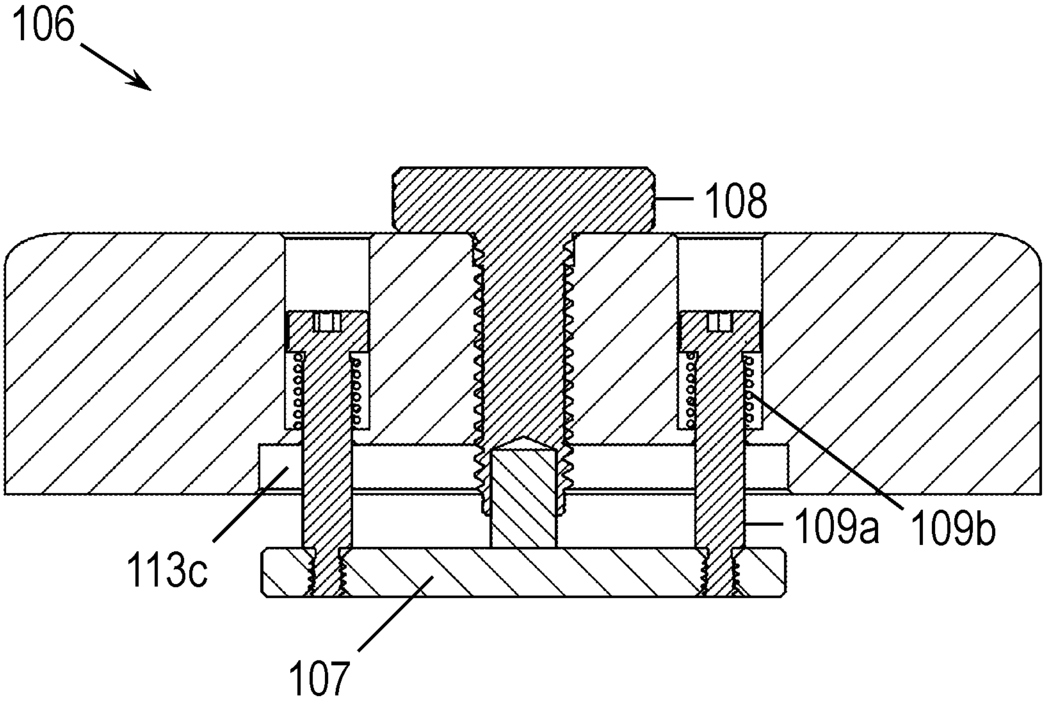
FIG. 8B illustrates a section view taken along section A-A of FIG. 7 of a stabilizer pad assembly with a stabilizer pad extended, in accordance with an embodiment of the present invention.

The lower base 111 of the socket clamp assembly 110 is designed to rest on the surface of the OR table 101. However, some OR table manufacturers position the side rail 102 such that the socket clamp assembly 110, when it is at its lowest position in the rail clamp 103, sits a few millimeters above the surface of the OR table 101, as shown in FIG. 5. In this case, a stabilizer pad assembly 106 may be used to contact the surface of an OR table 101 and provide additional stability against tilting. Accordingly, the lower base 111 of the socket clamp assembly 110 may comprise one or more extendable stabilizer pad assemblies 106, as shown in FIGS. 4, 6 and 7. A stabilizer pad assembly 106, shown in section view in FIGS. 8A and 8B. may comprise a stabilizer pad 107 disposed in a matching recess 113*c* formed in the bottom of the lower base 111. A thumb screw 108 may be rotationally coupled to the stabilizer pad 107 such that clockwise turning of the screw 108 urges the pad 107 downward away from the lower base 111 and toward the surface of the OR table 101, as shown in FIGS. 5 and 8B. Shoulder bolts 109*a* and biasing elements 109*b* provide a restoring force that causes the stabilizer pad 107 to retract into the recess 113*c* when the thumb screw 108 is rotated counterclockwise, as illustrated in FIG. 8A. In this way, multiple OR table/rail arrangements may be accommodated and the maximum stability of the leg positioner 100 achieved.

Referring to FIGS. 4 and 7, the upper base 116 may be configured to open and close about a hinge assembly 115 and be secured by a handle assembly 119 to provide clamping of a separate component, such as the ball of a first arm assembly 120. The upper base 116 may comprise a plurality of openings 117*a*-117*c*, 118 adapted for various purposes. A first through opening 117*a* may receive the threaded portion 119*b* of the handle assembly 119 as it is inserted into lower base 111. A second through opening 117*b* may be included to lightweight the upper base 116. The hinge assembly 115 may be coupled to a horseshoe shaped opening 117*c* at one end of the upper base portion using a hinge post 115*b* and hinge pin 115*f*. A ball socket may be formed in the upper base 116 by a keyhole shaped opening 118 with a bowl or otherwise chamfered surface 118*a* configured to receive a ball. The keyhole opening 118 may provide the clearance necessary to angularly position the stem 123 of a lower extension arm 122, as shown in FIG. 1. In a closed position, the socket clamp assembly 110 may be rigidly coupled to a ball 121 by rotation of a first fastener assembly 119 composed of a handle 119*a* and threaded portion 119*b*, which is fed through an opening 117*a* of the upper base 116 and threaded into opening 112*b* of the lower base 111. The through holes, as well as the separable nature of other components herein, may provide for enhanced sterilization characteristics of the knee positioner 100.

Figure 9:
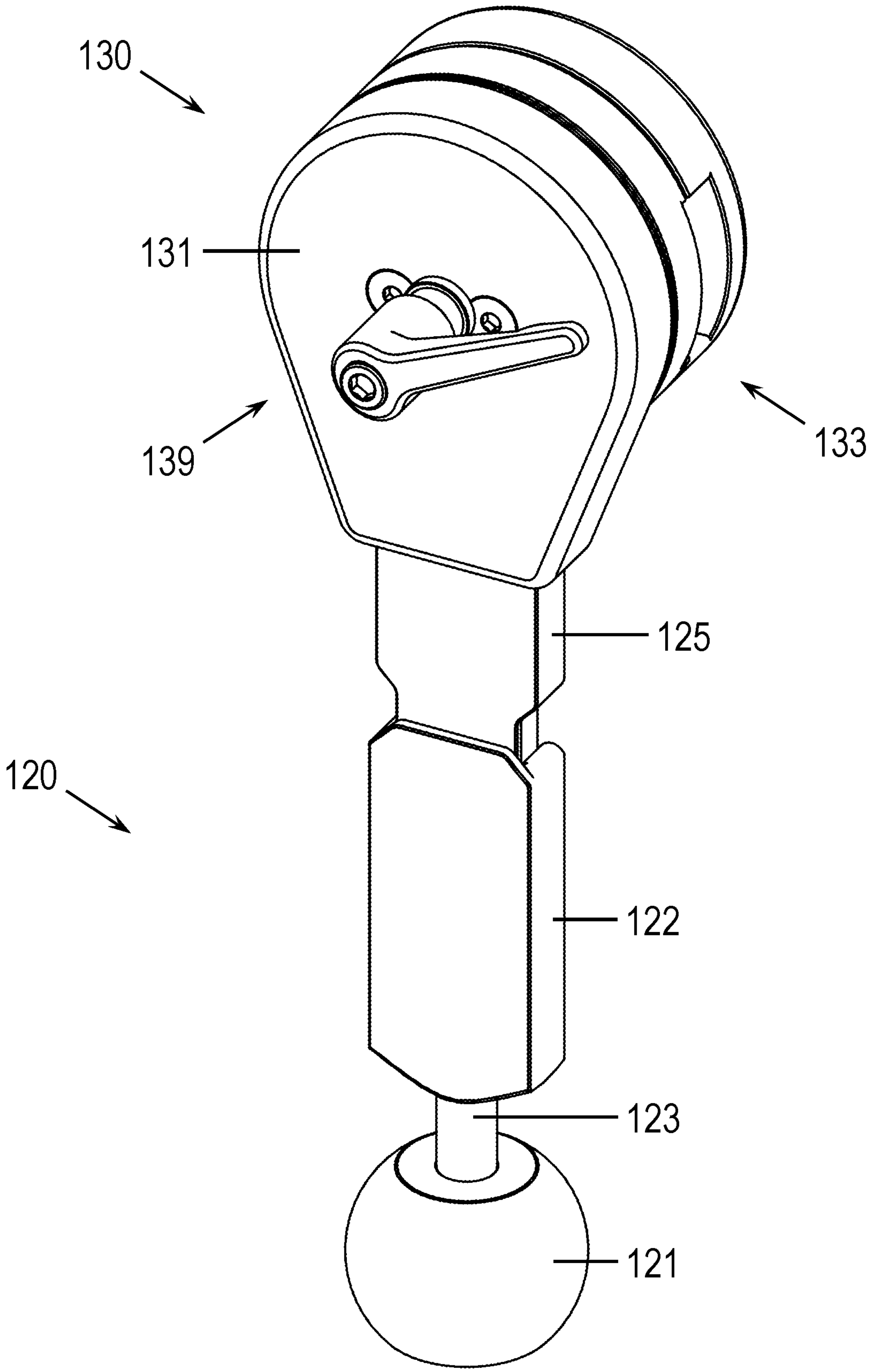
FIG. 9 illustrates a front, top, right side perspective view of a first arm and elbow joint for a unicompartmental knee positioner, in accordance with an embodiment of the present invention.
Figure 10A:
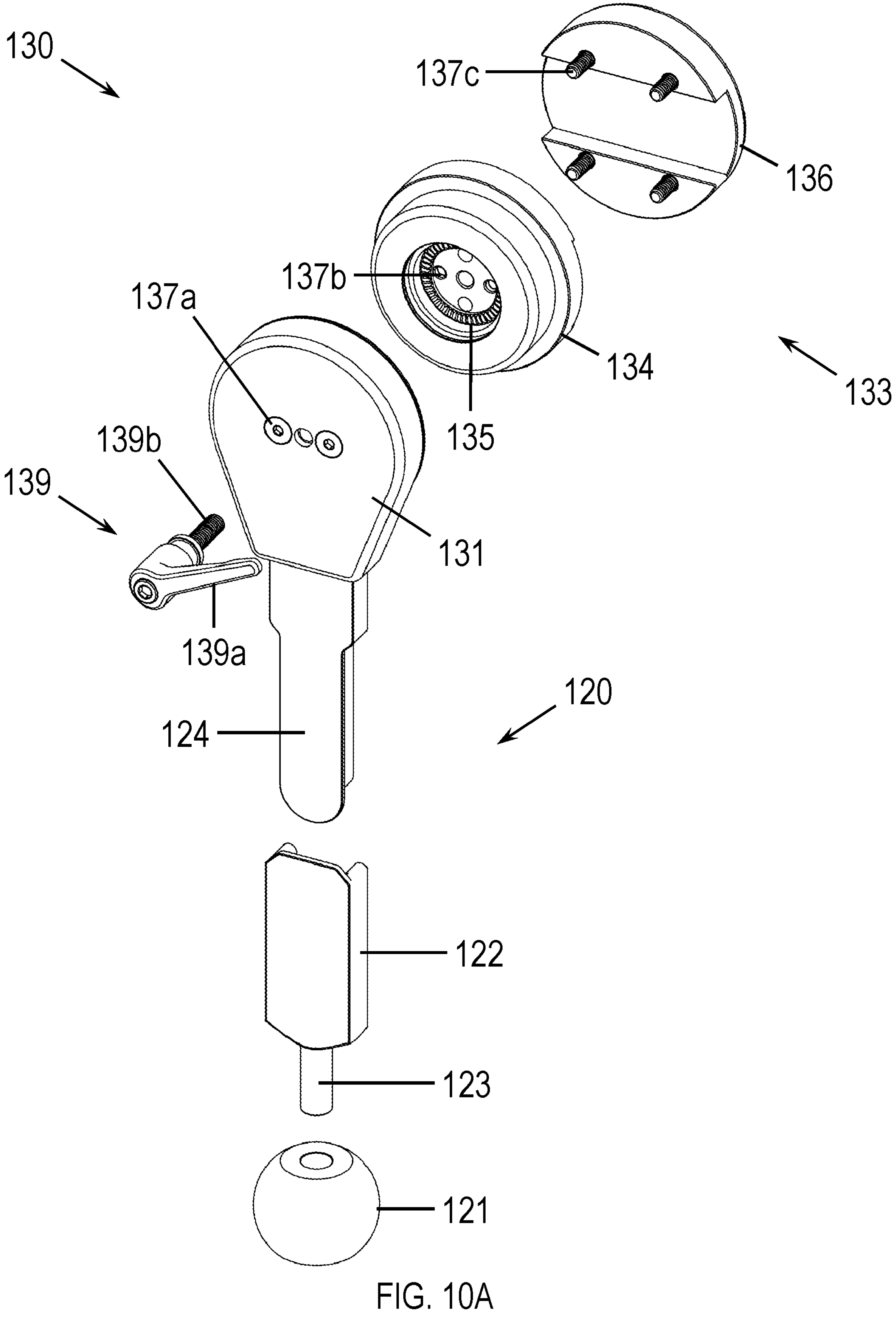
FIG. 10A illustrates a front, top, right side, exploded view of a first arm and elbow joint for a unicompartmental knee positioner, in accordance with an embodiment of the present invention.
Figure 10B:
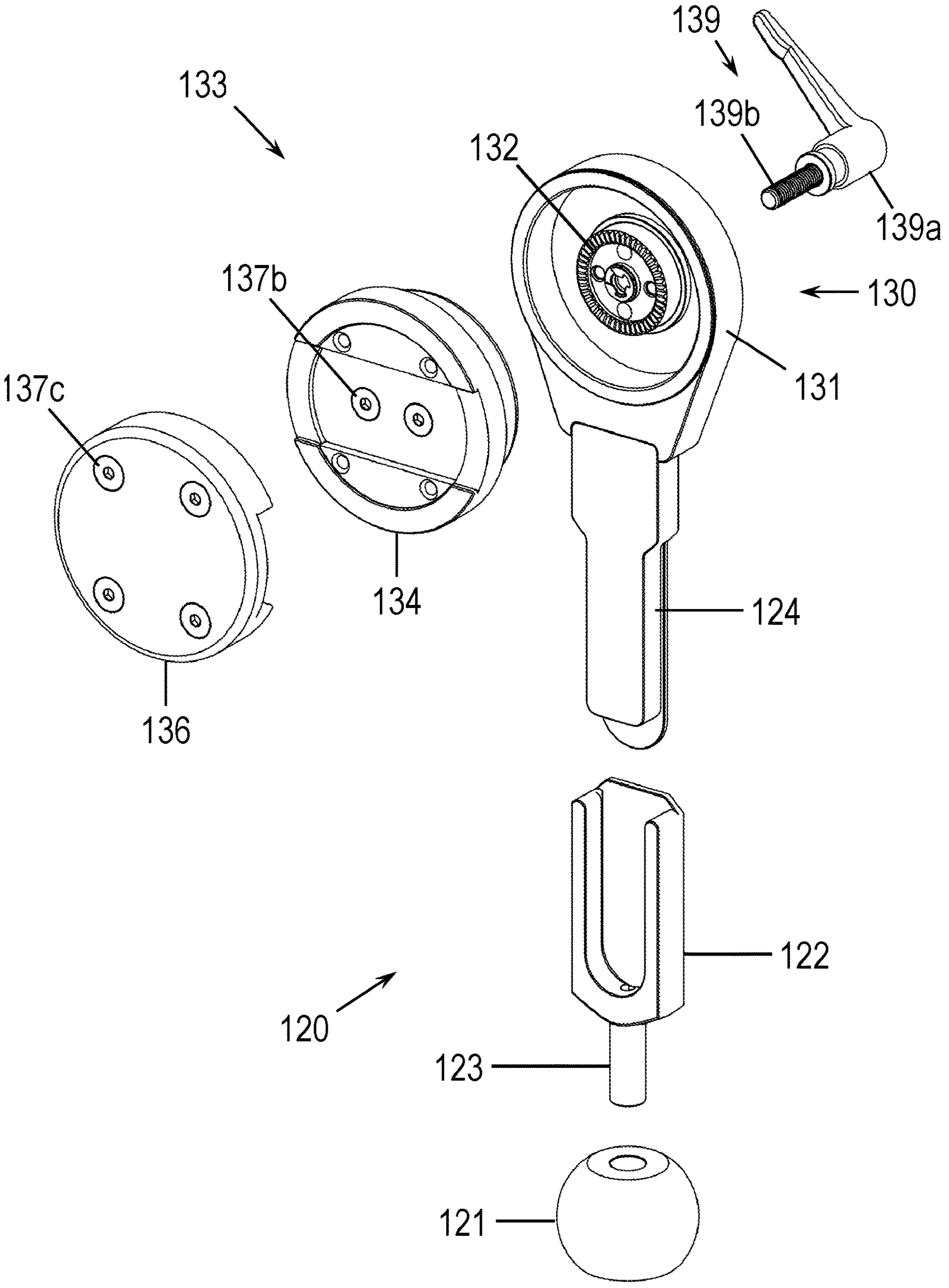
FIG. 10B illustrates a back, top, left side, exploded view of a first arm and elbow joint for a unicompartmental knee positioner, in accordance with an embodiment of the present invention.

As shown in FIG. 1, the socket clamp assembly 110 couples to first arm 120 and elbow 130 assemblies and allows the positioning thereof along multiple rotational axes. FIGS. 9-10B illustrate the first arm 120 and elbow 130 assemblies in greater detail. The first arm 120 comprises a ball 121 coupled to the stem 123 of a lower extension arm 122. The ball 121 and stem 123 may be assembled through the keyhole opening 118 of the upper base 116. An upper extension arm 124 may be inserted into the lower extension arm and held in place by gravity and the weight of a couped leg, or additionally by a fastener (not shown).

The first arm assembly 120 may be coupled to an elbow joint assembly 130 configured to receive and position a second arm 140. The elbow joint assembly 130 comprises a housing 131 coupled to a first adapter assembly 133 and operated with a second fastener assembly 139. FIGS. 10A and 10B provide exploded front and rear views, respectively, of the elbow joint assembly 130 wherein the first adapter assembly 133 may be seen to comprise inner 134 and outer 136 adapter portions, which, when assembled using fasteners 137*c*, may fixedly couple to a second arm 140 disposed therebetween. The first adapter assembly 133 may be rotatably coupled to the housing 131 using a second fastener assembly 139 comprising a handle 139*a* and threaded portion 139*b* which may pass through the housing 131 and be inserted into a threaded opening in the adapter inner portion 134. The rotational position of the first adapter assembly 133 with respect to the housing 131 may be secured with the aid of first 132 and second 135 serrated locking plates. The first serrated locking plate 132 may be assembled to the housing 131 using fasteners 137*a* while the second serrated locking plate 135 may be assembled to the inner adapter portion 134 using fasteners 137*b*. When the second fastener assembly 139 is loose, the first adapter assembly 133 may be rotated relative to the housing 131. When the second fastener assembly 139 is tight, the first adapter assembly 133 is rotationally fixed. In this way the leg holder assemblies 160, 170 may be extended, raised or lowered by adjusting the angle of the elbow joint assembly 130.

Figure 11A:
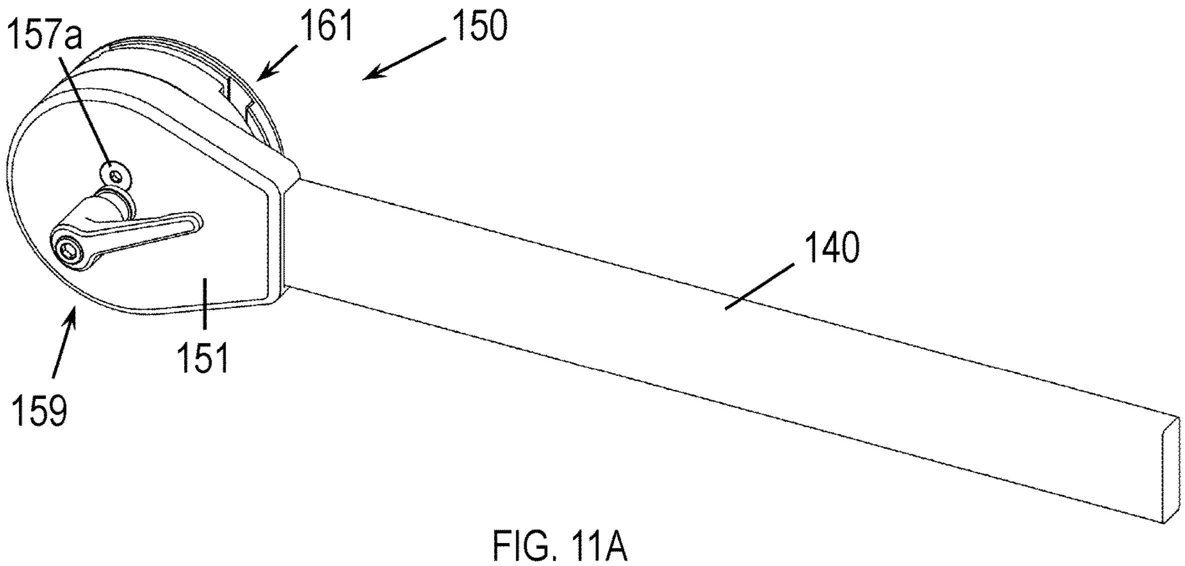
FIG. 11A illustrates a front, top, right side perspective view of a second arm and wrist joint for a unicompartmental knee positioner, in accordance with an embodiment of the present invention.
Figure 11B:
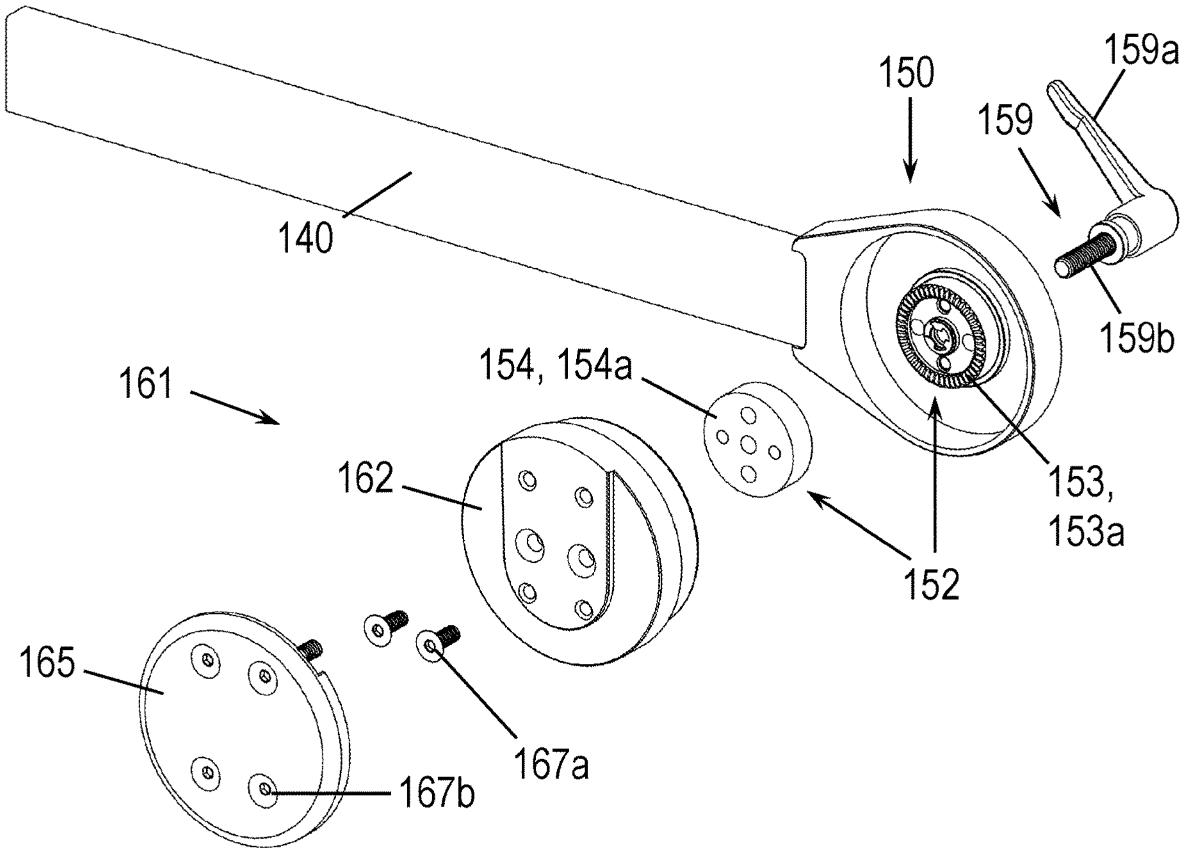
FIG. 11B illustrates a back, top, left side exploded view of a second arm and wrist joint for a unicompartmental knee positioner, in accordance with an embodiment of the present invention.

As shown in FIG. 1, the elbow joint assembly 130 couples to second arm 140 which couples to a wrist joint 150 assembly and allows the positioning thereof along multiple rotational axes. The second arm 140 comprises a beam which may slidably couple to the elbow joint 130 and may fixedly couple to the wrist joint 150. FIGS. 11A and 11B provide front assembled and rear exploded views, respectively, of the second arm 140 and wrist joint 150 assemblies. The wrist joint assembly 150 comprises a housing 151 coupled to a second adapter assembly 152 and operated with a third fastener assembly 159. In FIG. 11B a third adapter assembly 160 may be seen to comprise inner 162 and outer 165 adapter portions, which, when assembled using fasteners 167*b*, may fixedly couple to a leg holder assembly 160 (not shown) disposed therebetween. The second adapter assembly 152 may be rotatably coupled to the housing 151 using a third fastener assembly 159 comprising a handle 159*a* and threaded portion 159*b* which may pass through the housing 151 and be inserted into a threaded opening in the adapter inner portion 153. The rotational position of the first adapter assembly 152 with respect to the housing 151 may be secured with the aid of first 153*a* and second 154*a* serrated locking plates. The first serrated locking plate 153*a* may be assembled to the housing 151 using fasteners 157*a* while the second serrated locking plate 154*a* may be assembled to the second adapter inner portion 162 using fasteners 167*a*. When the second fastener assembly 159 is loose, the second serrated locking plate 154*a* may be rotated relative to the housing 151. When the second fastener assembly 159 is tight, the first adapter assembly 152 is rotationally fixed. In this way the leg holder assembly 160 may be rotated about a pitch axis by adjusting the angle of the wrist joint assembly 150.

Figure 12:
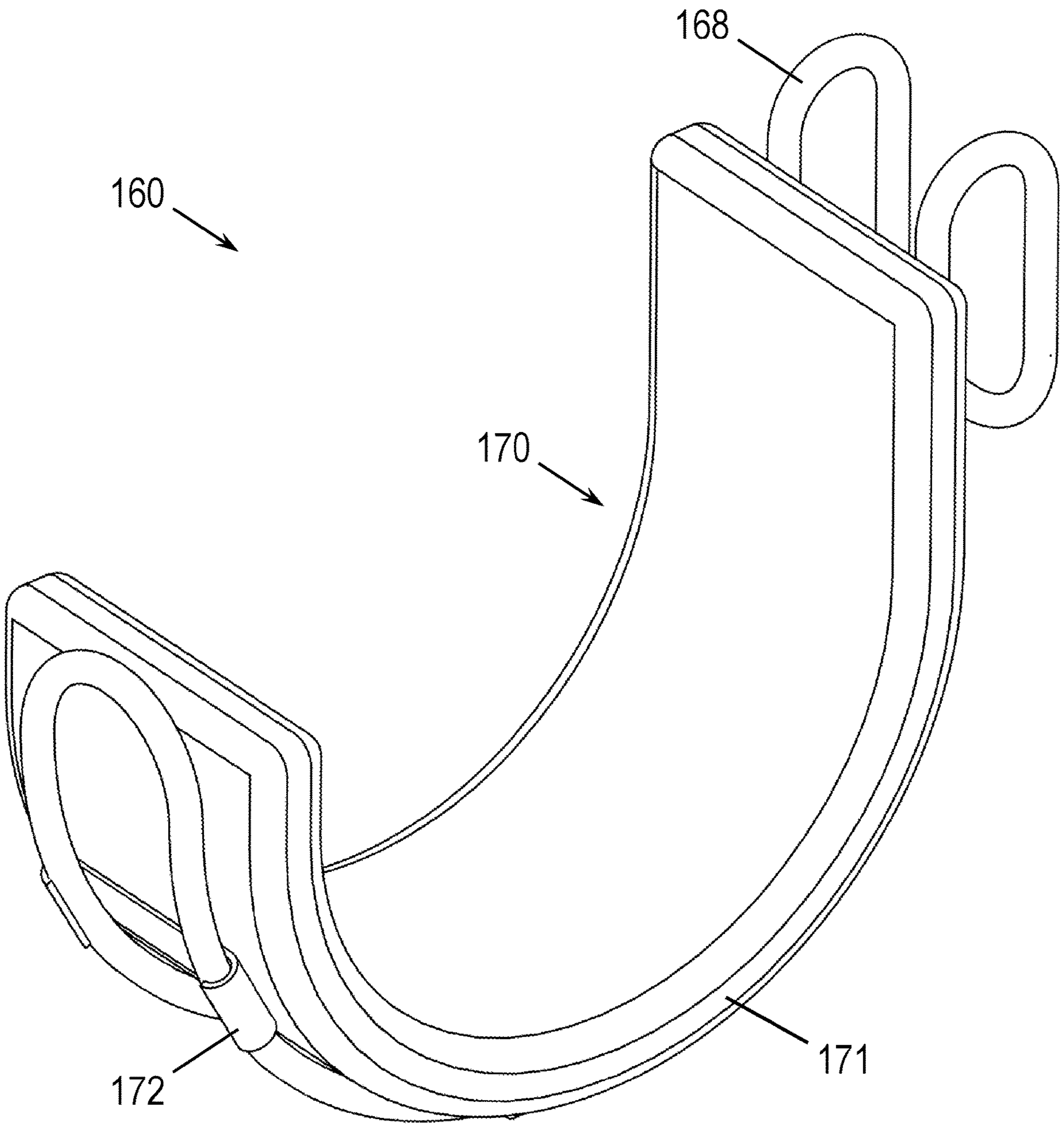
FIG. 12 illustrates a back, top, left side perspective view of a leg holder assembly for a unicompartmental knee positioner, in accordance with an embodiment of the present invention.
Figure 13:
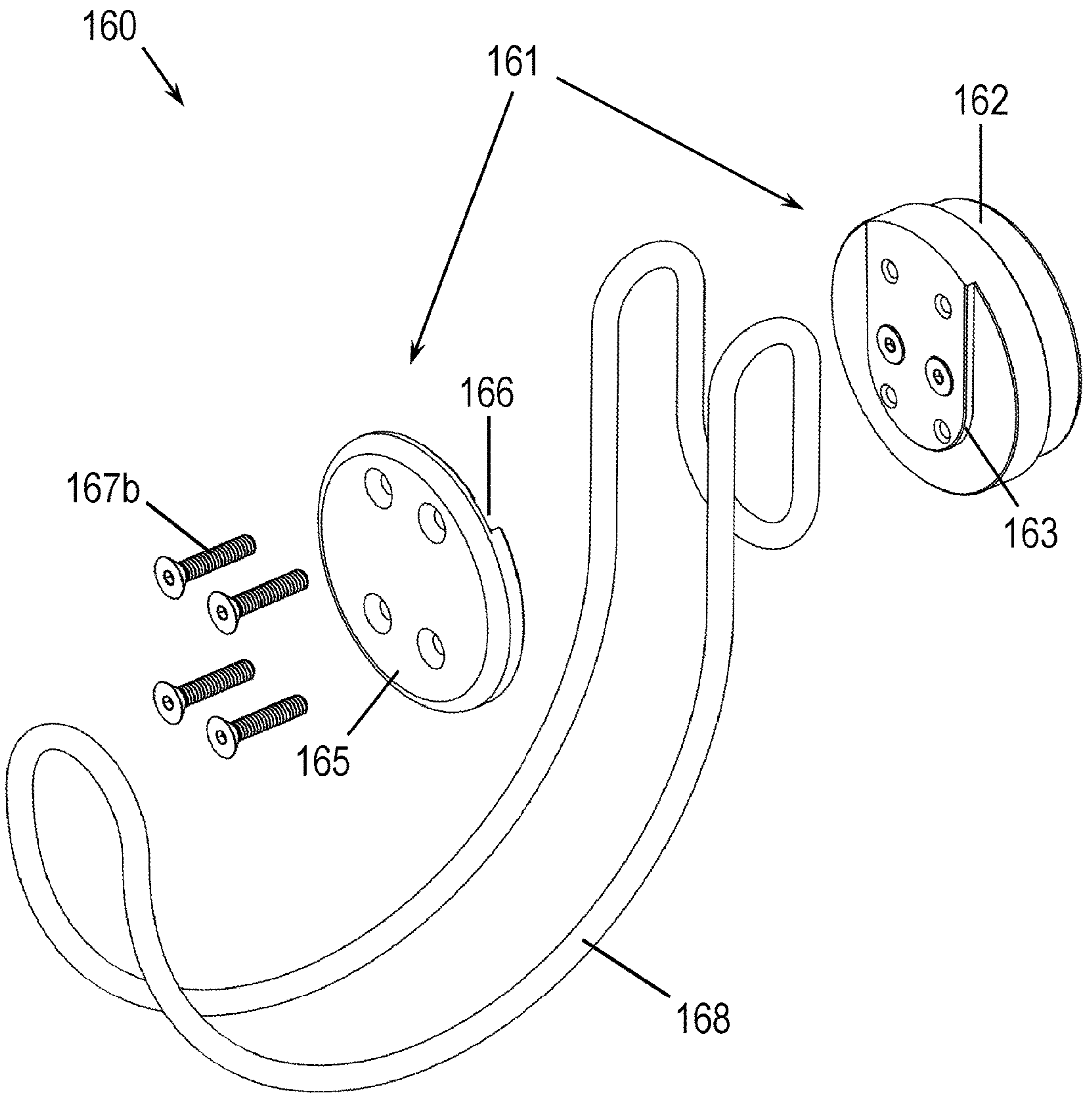
FIG. 13 illustrates a back, top, left side exploded view of a leg holder loop and third adapter assembly for a unicompartmental knee positioner, in accordance with an embodiment of the present invention.

FIG. 12 illustrates the leg holder assembly 160 which may comprise a third adapter assembly 161 (not shown), leg holder loop 168 and leg pad assembly 170. The leg pad assembly 170 may be fixed to the leg holder loop 168 using one or more clips 172, which provide for easy assembly and disassembly. The leg pad 171 material may be chosen for patient comfort and support (i.e. without regard for sterilizability) and overall component cost and may be indicated as single-use. The third adapter assembly 161 may be coupled to leg holder loop 168, as shown in FIG. 13. Alignment and retention of the leg holder loop 161 may be achieved by a U-shaped loop orientation protrusion 163 disposed on the inner adapter portion 162 in conjunction with a loop orientation slot 166 disposed in the outer adapter portion 165. One or more fasteners 167*b* may be inserted through openings in both inner 162 and outer 165 adapter portions to clamp the loop 168. Advantageously, the loop 168 and adapter 161 design of the leg holder assembly 160 facilitates sterilization.

Figure 14A:
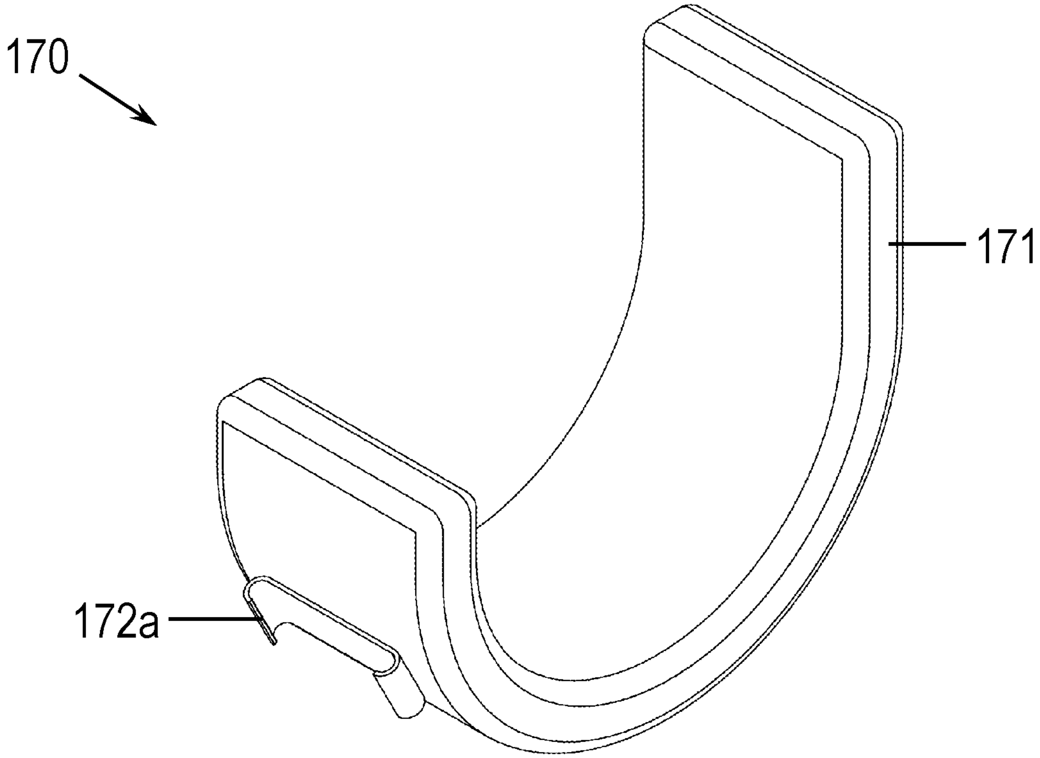
FIG. 14A illustrates a back, top, left side perspective view of a leg pad assembly for a unicompartmental knee positioner, in accordance with an embodiment of the present invention.
Figure 14B:
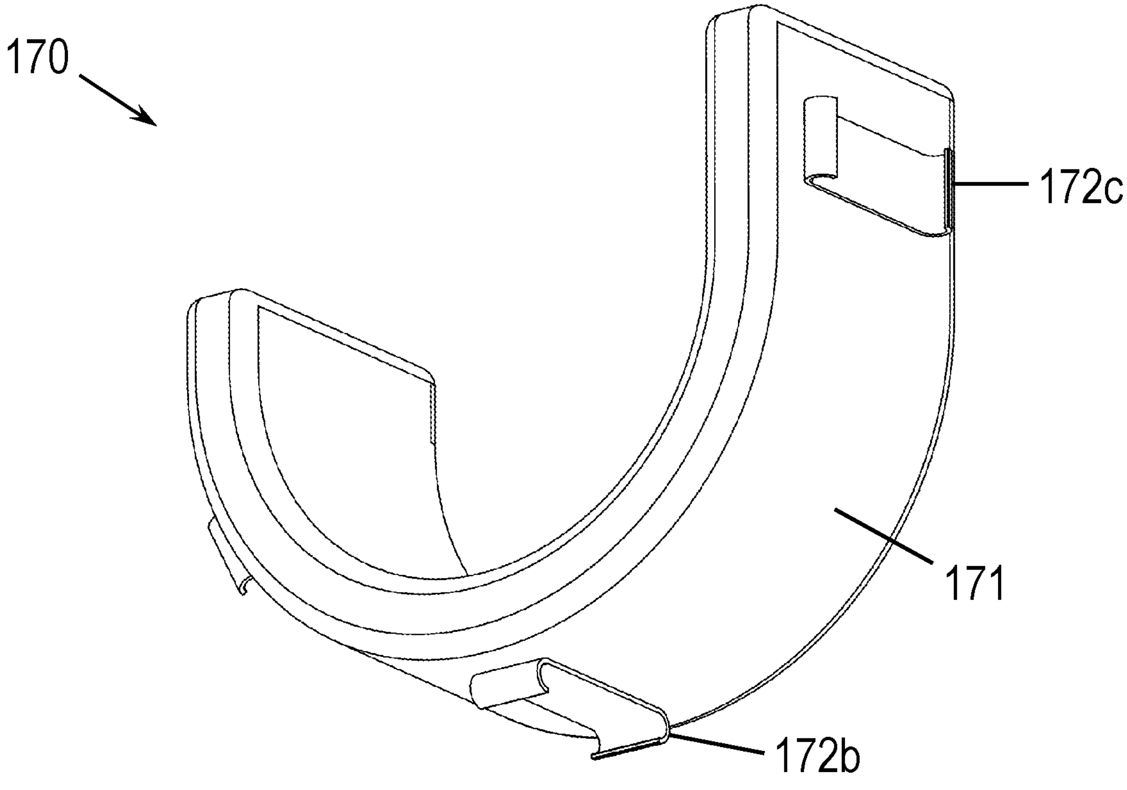
FIG. 14B illustrates a front, bottom, left side perspective view of a leg pad assembly for a unicompartmental knee positioner, in accordance with an embodiment of the present invention.

The leg pad assembly 170 is shown in FIGS. 14A-14B in greater detail. The leg pad 171 may have a shape substantially matching the leg holder loop 168 and be made of one or more materials that allow elastic deformation and compression under the weight of a leg. The leg pad may be fitted with one or more clips 172*a*-172*c* which conform to the shape and spacing of the leg holder loop 168. The clips 172*a*-172*c* may be attached to the leg pad 171 with adhesive or other suitable fastener. A slight oversizing of the leg pad 171 with respect to the loop 168 may be employed to produce a small expansion force in the pad 171 which aids in retention of the leg pad assembly 170 on the leg holder assembly 160. The leg holder 160 and/or leg pad 170 assemblies represent a solution to the-concurrent needs for comfort, sterilizability and low cost; the leg pad is large for comfort while the leg loop conserves space in a standard sterilization tray, and both may be produced at low cost.

Figure 15:
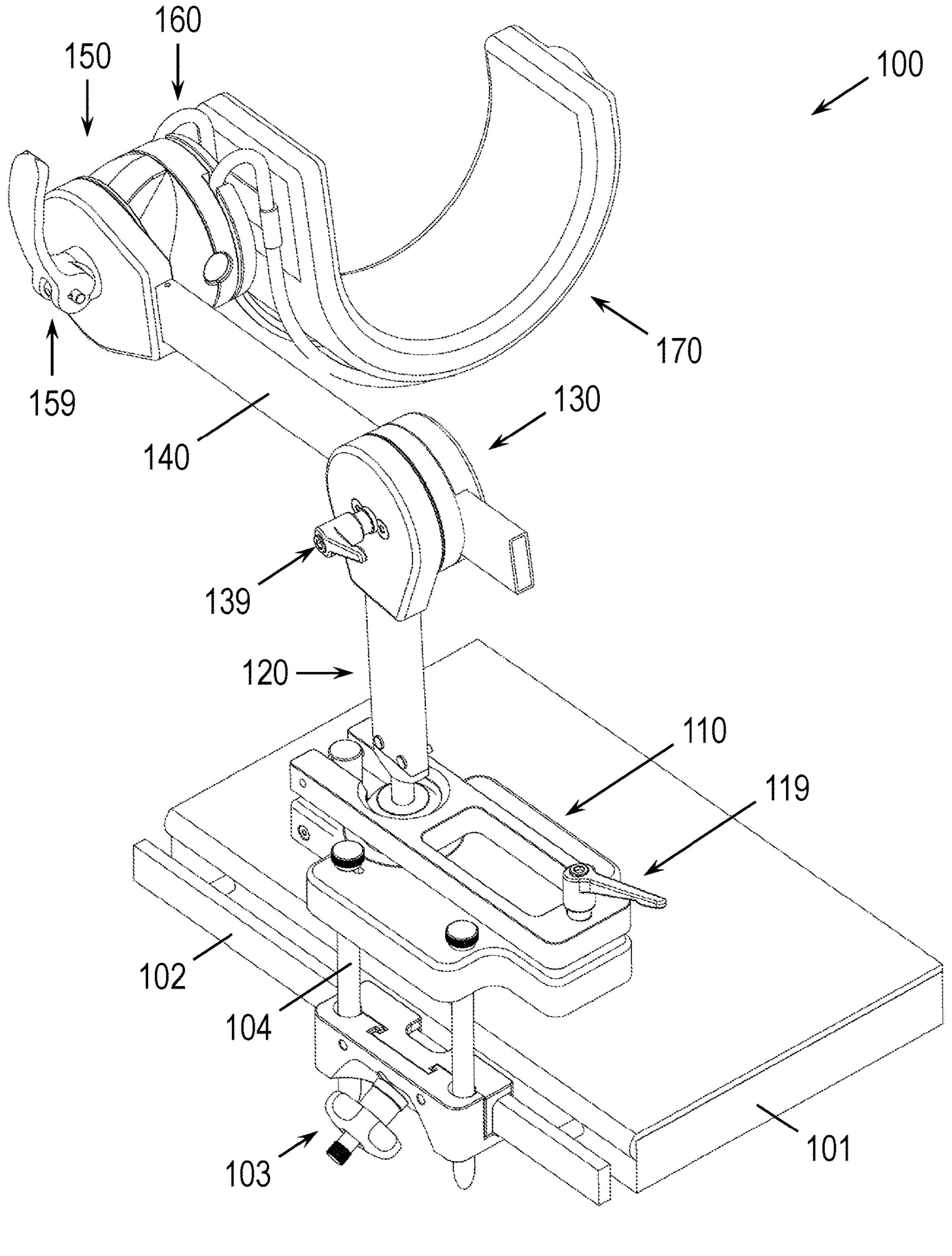
FIG. 15 illustrates a front, top, right side perspective view of a unicompartmental knee positioner, in accordance with an alternate embodiment of the present invention.
Figure 16A:
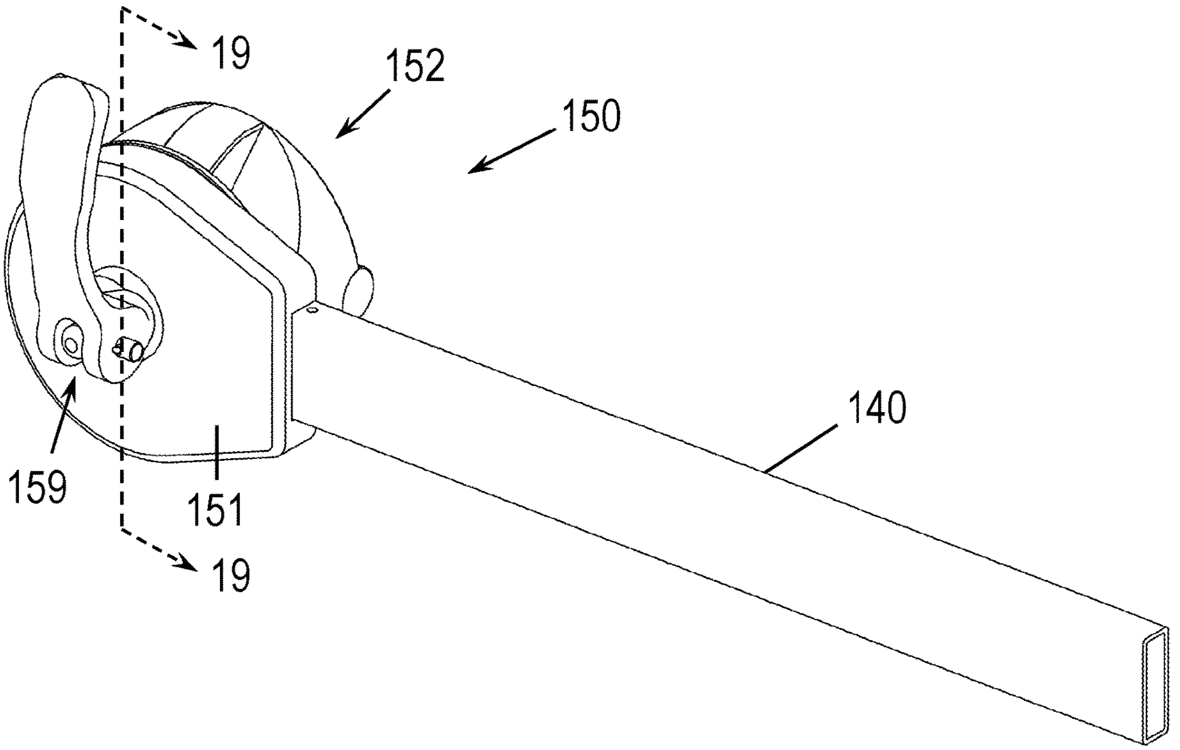
FIG. 16A illustrates a front, top, right side perspective view of a second arm and wrist joint for a unicompartmental knee positioner, in accordance with an alternate embodiment of the present invention.
Figure 16B:
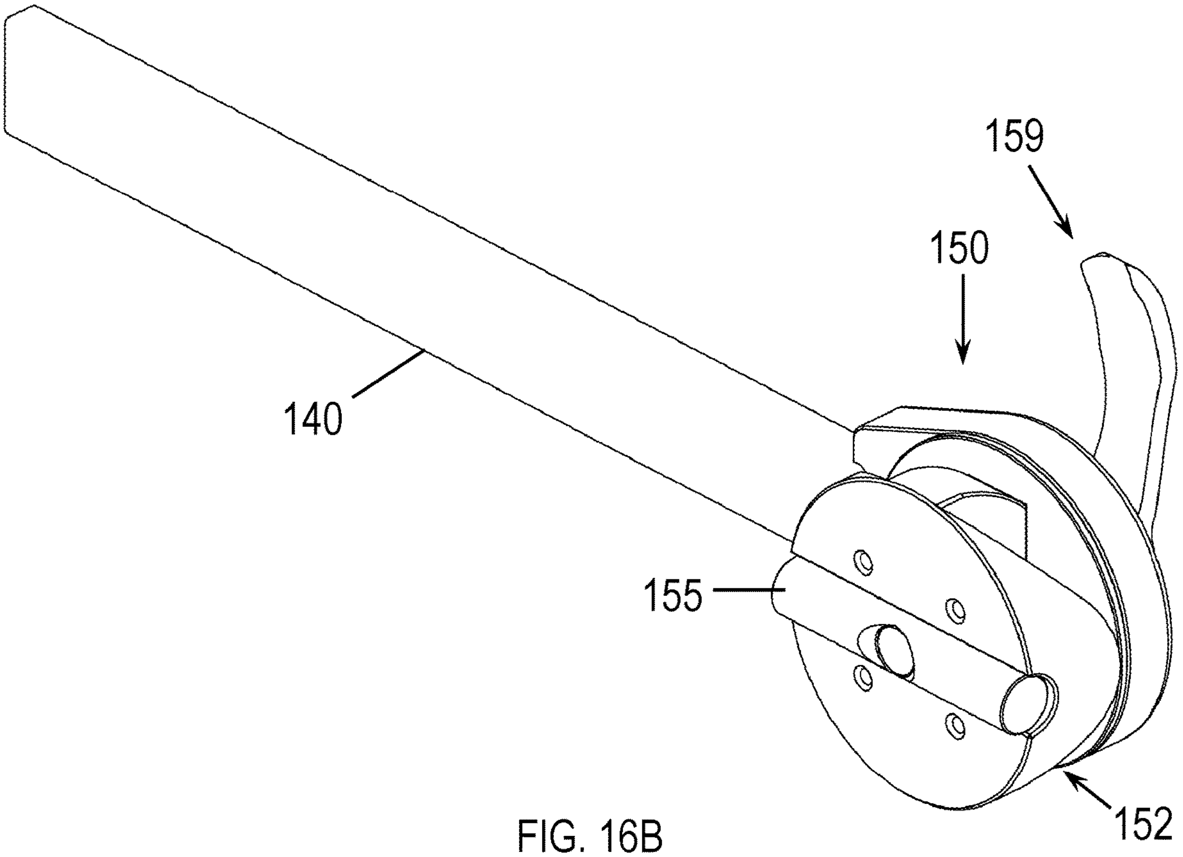
FIG. 16B illustrates a back, top, left side perspective view of a second arm and wrist joint for a unicompartmental knee positioner, in accordance with an alternate embodiment of the present invention.
Figure 17:
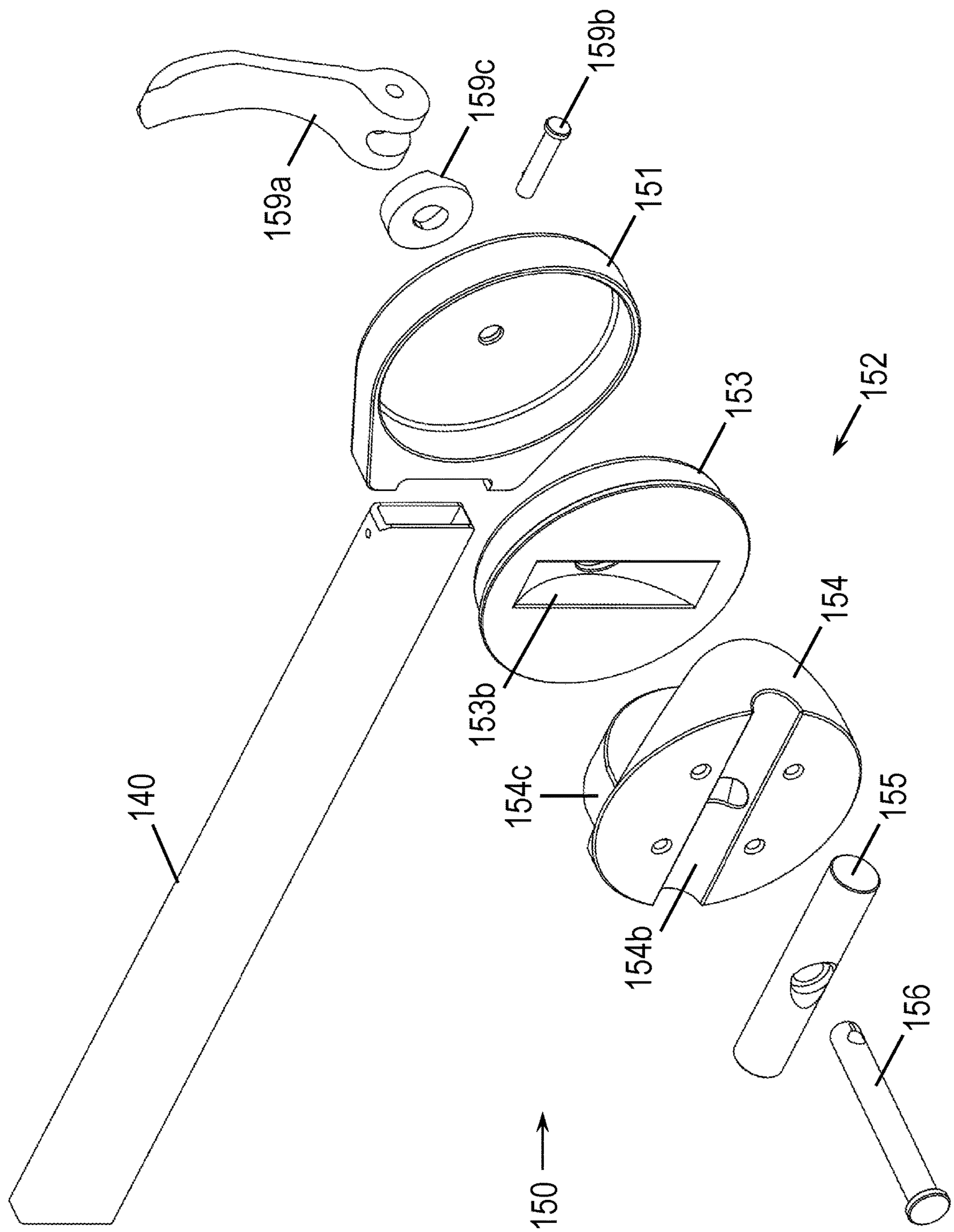
FIG. 17 illustrates a back, top, left side exploded view of a second arm and wrist joint for a unicompartmental knee positioner, in accordance with an alternate embodiment of the present invention.
Figure 18:
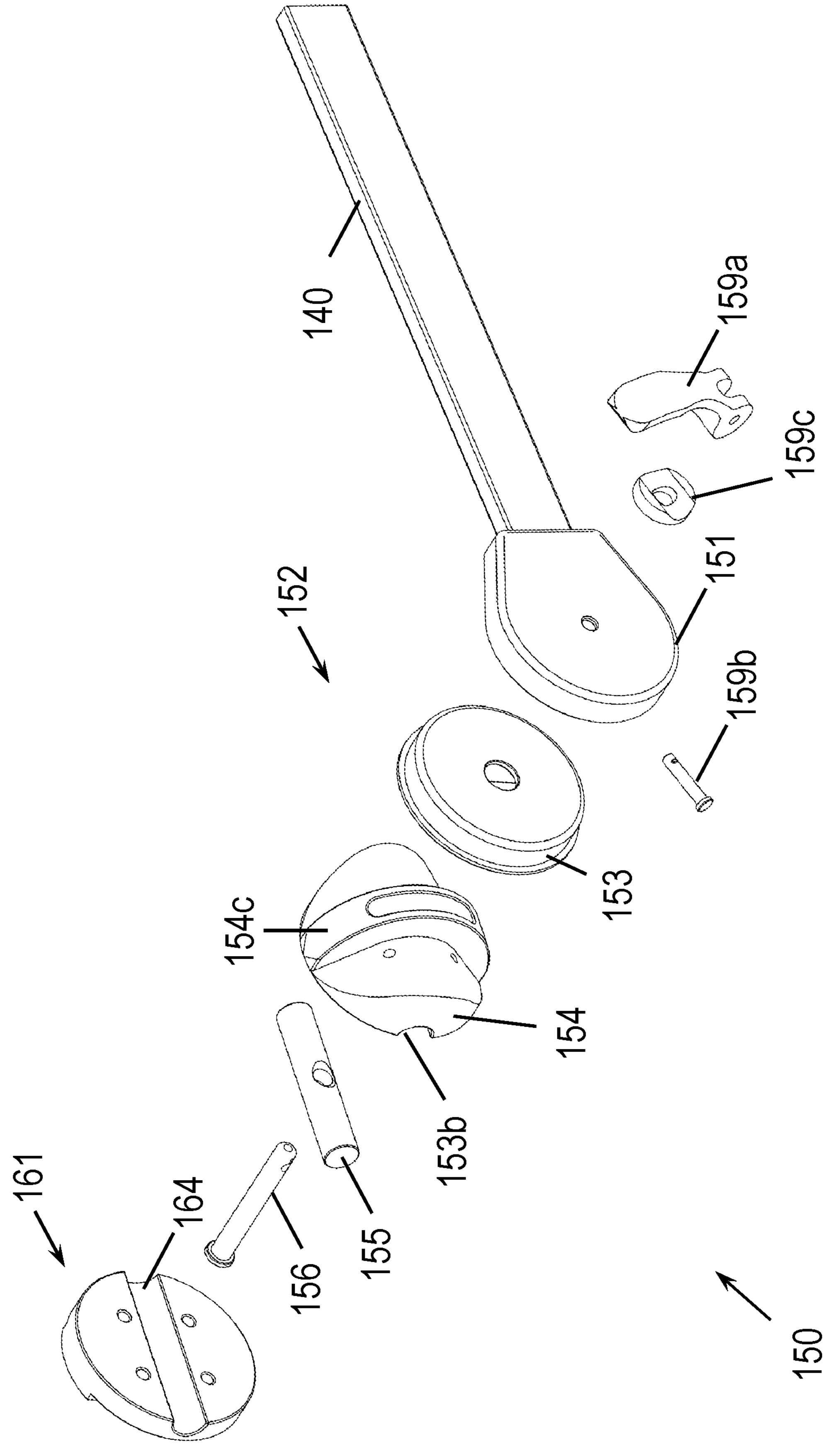
FIG. 18 illustrates a back, top, right side exploded view of a second arm and wrist joint for a unicompartmental knee positioner, in accordance with an alternate embodiment of the present invention.

Referring to FIG. 15, alternate embodiments for the wrist joint assembly 150 and third adapter assembly 161 are shown in the context of the entire unicompartmental knee positioner 100. FIGS. 16-20 illustrate the wrist assembly 150 and third adapter assembly 161 in greater detail. In FIG. 16A the wrist joint assembly 150 comprises a housing 151, a second adapter assembly 152 and a third fastener assembly 159. In FIG. 6B the face of the second adapter assembly 152 may be seen to couple to a cinch axle 155 about which the second adapter assembly 152 rotates. FIGS. 17 and 18 illustrate exploded views of the wrist joint assembly 150 in the orientation of, e.g. FIG. 16B, and more clearly shows the degrees of freedom provided. The second adapter assembly 152 may be seen to comprise inner 153 and outer 154 adapter portions, which, when assembled allow a limited roll movement of the leg holder assembly 160 (not shown). This movement is enabled by a semi-circular protrusion 154*c* disposed on the outer adapter portion 154 which may be mated to a semi-circular slot 153*b* disposed in the inner adapter portion 153. The outer adapter portion 154 comprises a semi-circular groove 154*b* adapted to receive the cinch axel 155. The cinch axel 155, in turn, is adapted to receive a cinch pin 156 at its center. The cinch pin 156 may slide through the cinch axle 155, outer 154 and inner 153 adapter portions and housing 151. At the other end of the housing 151 the cinch pin 156 may be coupled to a third fastener assembly 159 comprising a cinch handle 159*a*, locking pin 159*b*, and a bushing 159*c*. With the bushing 159*c* disposed between the cinch handle 159*a* and housing 151, and the cinch pin 156 inserted through both, the locking pin 159*b* may be inserted into openings in the cinch handle 159*a* and cinch pin 156, providing a rotatable coupling therebetween. In an open position, the handle 159*a* is arranged relative to the housing, for example, substantially perpendicular to the housing 151, with the cinch pin 156 loosened, and whereby the wrist joint assembly 150 may be rotated to produce both roll and pitch motions. In a closed position, the handle 159*a* is substantially parallel to the housing 151, the cinch pin 156 is fixed and the wrist joint assembly 150 resists all motion. In one embodiment, the interface between inner adapter 153 and housing 151 operates as a disk break having a compression-type fit; either, both, or neither surface may be made of a durable plastic that deforms to provide the compression fit, or both surfaces may be metal and a compression-type fit may still be achieved. Any other locking methods may be employed, such as any manner of teeth that cause the two surfaces to mesh.

Figure 19:
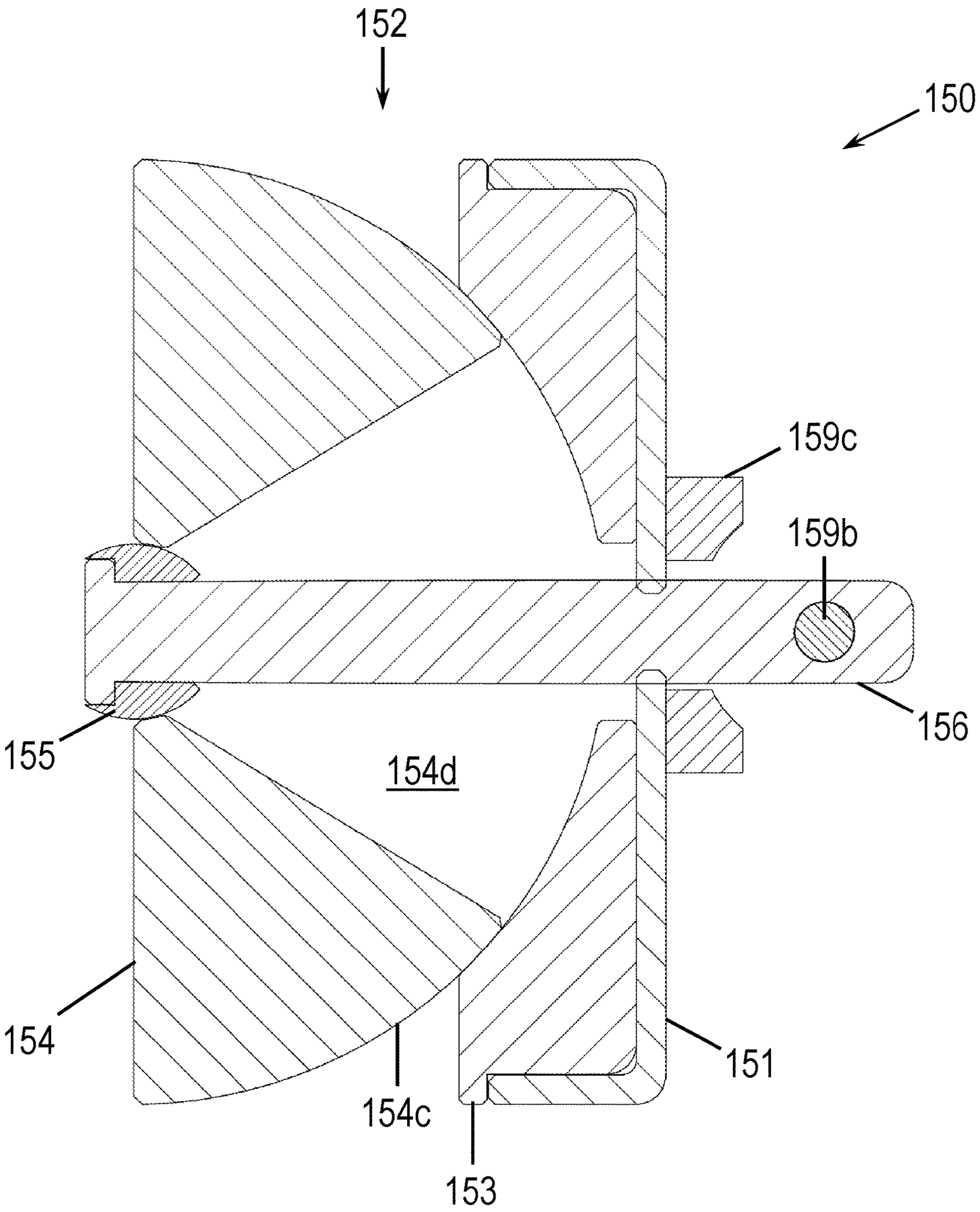
FIG. 19 illustrates a section view taken along line 19-19 of FIG. 16A of a wrist joint for a unicompartmental knee positioner, in accordance with an alternate embodiment of the present invention.

An advantage of the present invention relates to a range of motion safety feature that may limit the roll motion of the adapter assembly 152 by an angular slot 154*d* disposed within the semi-circular protrusion 154*c* of the outer adapter portion 154, as shown in the section view in FIG. 19. The angular extents of the angular slot 154*d* may be chosen based on, for example, the need to prevent a leg from falling out of the leg pad assembly 170 if the wrist fastener assembly 159 were to be released. A suitable range of roll motion for the leg loop and pad assemblies may be, for example, +30° from horizontal. The range of motion may be chosen to be symmetric or asymmetric and the specific range given should not be construed as limiting.

Figure 20:
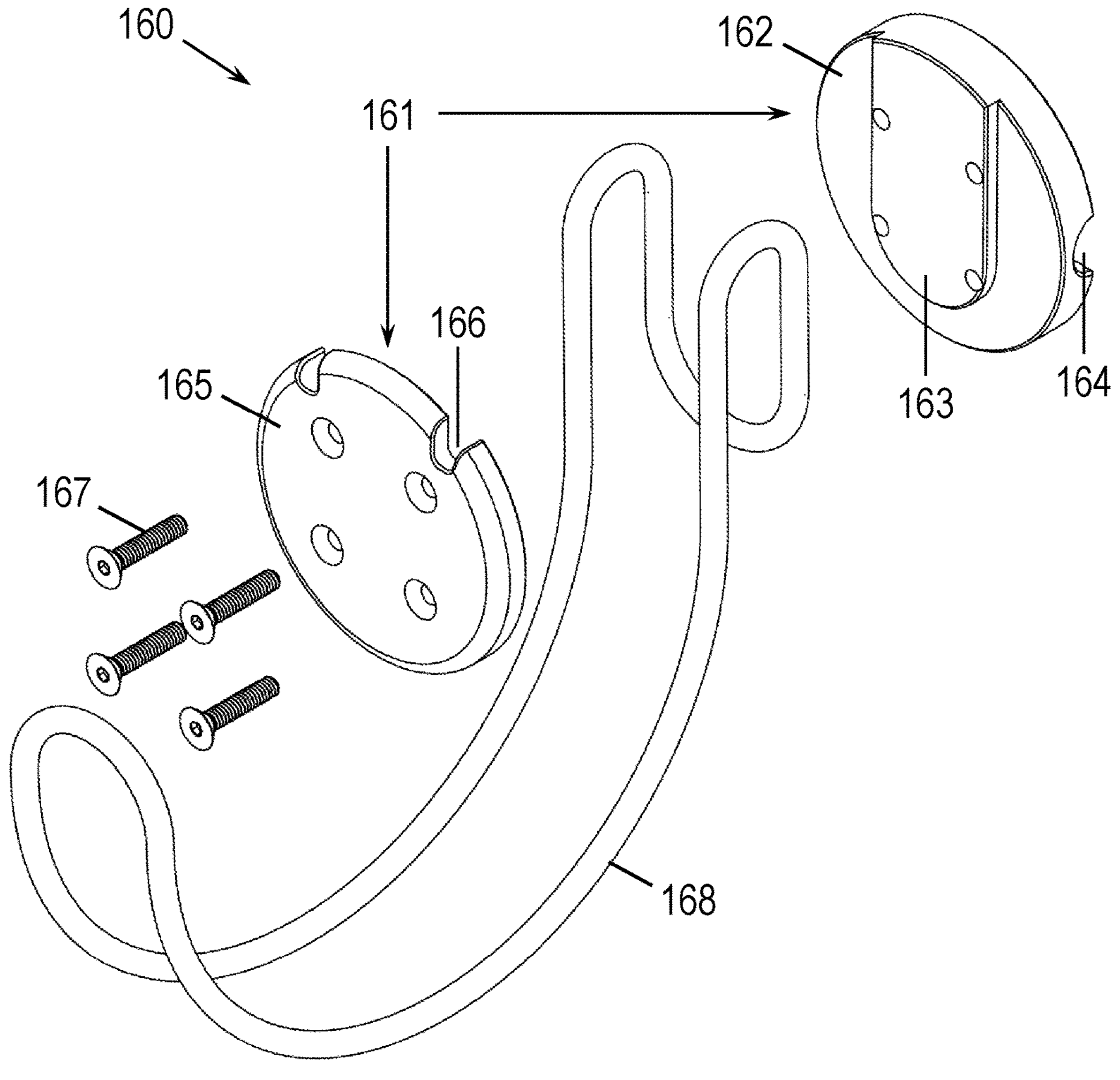
FIG. 20 illustrates a back, top, left side, exploded perspective view of a leg holder assembly for a unicompartmental knee positioner, in accordance with an alternate embodiment of the present invention.

The wrist joint assembly 150 may be coupled to leg holder 160 and leg pad 170 assemblies, as shown in FIG. 15. The leg holder assembly 160 comprises a third adapter assembly 161 coupled to a leg holder loop 168. FIG. 20 gives an exploded view of the leg holder assembly 160 and third adapter assembly 161 which comprises inner 162 and outer 165 adapter portions configured to receive the leg holder loop 168. Alignment and retention of the leg holder loop 168 may be achieved by a U-shaped loop orientation protrusion 163 disposed on the inner adapter portion 162 in conjunction with a loop orientation slot 166 disposed in the outer adapter portion 165. One or more fasteners 167 may be inserted into through openings in both inner 162 and outer 165 third adapter portions and coupled to the outer portion 154 of the second adapter assembly 152. In an assembled configuration the inner portion 162 of the third adapter assembly 161 is coupled to the cinch pin 155 (not shown) thereby aligning and retaining the leg loop 168 to the wrist joint assembly 150. Advantageously, the leg loop 168 and third adapter 161 design of the leg holder assembly 160 facilitates sterilization of the leg loop 168 and third adapter 161 as these lack recesses and/or other accumulating structures.

While certain configurations of structures have been illustrated for the purposes of presenting the basic structures of the present invention, one of ordinary skill in the art will appreciate that other variations are possible which would still fall within the scope of the appended claims. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A surgical knee positioner comprising:

a socket clamp assembly including:

a lower plate having a lower spherical recess, an upper plate having an upper spherical recess, and first and second sides, said upper plate adapted to be coupled to the lower plate by a hinge proximate one end, a first lever for operably coupling the socket clamp by moving the lower and upper plate spherical recesses closer together or farther apart, respectively, and one or more openings disposed in the lower plate proximal each side of the upper plate and being configured to receive one or more fixing pins;

a first arm assembly including:

a ball configured to be disposed within said upper and lower spherical recesses, and a first arm and stem coupled at one end to said ball, wherein when said first lever is loosened, the ball is configured to rotate about two planes, and wherein when said first lever is tightened, the ball is rigidly fixed with respect to said upper and/or lower plate;

an elbow joint assembly adapted to be coupled to the first arm at another end, said elbow joint assembly including:

a housing coupled to a first serrated locking plate, a first adapter assembly having an inner adapter portion operably coupled to a second serrated locking plate and an outer adapter portion, and a second lever for tightening or loosening the elbow joint, wherein the elbow joint is configured to rotate about a single axis, and wherein, when the lever is moved to engage and/or operably couple, the first and second serrated locking plates prevent elbow joint movement;

a second arm operably coupled to the first adapter assembly, said second arm being translatable therethrough when said second lever is loosened, and rigidly fixed with respect to said first arm when said lever is tightened;

a wrist joint assembly operably coupled to said second arm including:

a housing coupled to a third serrated locking plate, and a second adapter assembly having an inner adapter portion with a U-shaped protrusion coupled to a fourth serrated locking plate, and an outer adapter portion forming a complementary U-shaped groove, and a third lever for tightening or loosening said wrist joint, wherein said wrist joint is configured to rotate about a single axis, and wherein, when said third lever is tightened, said third and fourth serrated locking plates prevent wrist joint movement;

a leg holder assembly coupled to said wrist joint assembly, said leg holder assembly including:

a loop having a U-shape for coupling between said U-shaped protrusion and said complementary U-shaped groove of said inner and outer adapter portions of said second adapter assembly; and a leg pad assembly configured to couple to the loop, said leg pad assembly including a leg pad and one or more leg pad clips configured to couple to the loop;

wherein, in operation, the surgical knee positioner may be configured to hold the thigh of a patient such that the knee dangles off the side or end of a support table.

2. A surgical knee positioner comprising:

a socket clamp assembly including:

a lower plate having a lower spherical recess, an upper plate having an upper spherical recess, and first and second sides, said upper plate adapted to be coupled to the lower plate by a hinge proximate one end, a first lever for operably coupling the socket clamp by moving the lower and upper plate spherical recesses closer together or farther apart, respectively, and one or more openings disposed in the lower plate proximal each side of the upper plate and being configured to receive one or more fixing pins;

a first arm assembly including:

a ball configured to be disposed within said upper and lower spherical recesses, and a first arm and stem coupled at one end to said ball, wherein when said first lever is loosened, the ball is configured to rotate about two planes, and wherein when said first lever is tightened, the ball is rigidly fixed with respect to said upper and/or lower plate;

an elbow joint assembly adapted to be coupled to the first arm at another end, said elbow joint assembly including:

a housing coupled to a first serrated locking plate, a first adapter assembly having an inner adapter portion operably coupled to a second serrated locking plate and an outer adapter portion, and a second lever for tightening or loosening the elbow joint, wherein the elbow joint is configured to rotate about a single axis, and wherein, when the lever is moved to engage and/or operably couple, the first and second serrated locking plates prevent elbow joint movement;

a second arm operably coupled to the first adapter assembly, said second arm being translatable therethrough when said second lever is loosened, and rigidly fixed with respect to said first arm when said lever is tightened;

a wrist joint assembly operably coupled to said second arm by a housing and a second adapter assembly, said second adapter assembly including:

an inner adapter portion configured to couple to said housing and having a semi-circular slot, an outer adapter portion having a complementary semi-circular protrusion formed within a first outer adapter side, said complementary semi-circular protrusion configured to rotate within said semi-circular slot when coupled thereto, and further having a semi-circular groove, a cinch axel formed in a substantially cylindrical shape and configured to couple to, and rotate with respect to, said semi-circular groove of said outer adapter portion, and a cinch pin fastener configured to abut against said cinch axel and extend through said cinch pin, said inner and outer adapter portions, and said housing to thereby couple with a third level, so that when said third lever is loosened, said wrist joint assembly is angularly adjustable along two orthogonal axes of rotation;

a third adapter assembly including:

an interior adapter portion configured to rigidly couple to said outer adapter portion and having a U-shaped groove, and an exterior adapter portion; and a leg holder assembly including:

a loop having a U-shape for coupling between said U-shaped protrusion of said interior portion and said exterior adapter portion; and a leg pad assembly configured to couple to the loop, said leg pad assembly including a leg pad and one or more leg pad clips configured to couple to the loop, wherein, in operation, the surgical knee positioner may be configured to hold the thigh of a patient such that the knee dangles off the side or end of a support table.

* * * * *